United States Patent
Holden et al.

(10) Patent No.: US 9,625,299 B2
(45) Date of Patent: Apr. 18, 2017

(54) ADJUSTABLE DOSING CAP

(71) Applicant: Diversey, Inc., Sturtevant, WI (US)

(72) Inventors: David J. Holden, Derbyshire (GB);
Jonathan D. Bradshaw, Nottingham (GB); Barry Hague, South Yorkshire (GB); Michael Bertucci, Gurnee, IL (US); Lambertus Gerardus P. Van Der Heijden, WB Bunnik (NL)

(73) Assignee: Diversey, Inc., Sturtevant, WI (US)

( * ) Notice: Subject to any disclaimer, the term of this patent is extended or adjusted under 35 U.S.C. 154(b) by 0 days.

(21) Appl. No.: 14/777,202

(22) PCT Filed: Mar. 14, 2014

(86) PCT No.: PCT/US2014/028769
§ 371 (c)(1),
(2) Date: Sep. 15, 2015

(87) PCT Pub. No.: WO2014/144381
PCT Pub. Date: Sep. 18, 2014

(65) Prior Publication Data
US 2016/0003658 A1 Jan. 7, 2016

Related U.S. Application Data

(60) Provisional application No. 61/788,450, filed on Mar. 15, 2013, provisional application No. 61/905,142, filed on Nov. 15, 2013.

(51) Int. Cl.
*G01F 11/26* (2006.01)
(52) U.S. Cl.
CPC .......... *G01F 11/263* (2013.01); *G01F 11/268* (2013.01)

(58) Field of Classification Search
CPC .............................. G01F 11/263; G01F 11/268
(Continued)

(56) References Cited

U.S. PATENT DOCUMENTS

| 2,787,405 A | 4/1957 | Shvetz |
| 2,904,227 A | 9/1959 | Graham |

(Continued)

FOREIGN PATENT DOCUMENTS

| EP | 0446805 | 9/1991 |
| GB | 2145061 | 3/1985 |

(Continued)

OTHER PUBLICATIONS

International Search Report, PCT/US2014/028769, Aug. 5, 2014.
(Continued)

*Primary Examiner* — Donnell Long
(74) *Attorney, Agent, or Firm* — Michael Best & Friedrich LLP

(57) ABSTRACT

A dispensing cap including a first housing portion defining a first chamber, a lid coupled to the first housing and defining an outlet, the lid movable between a first position and a second position, a second housing portion defining a second chamber in fluid communication with the first chamber, the second housing portion further defining a third chamber separate from the second chamber, wherein when the lid is in the first position, the outlet is in fluid communication with the second chamber to dispense a first volume of fluid, and wherein when the lid is in the second position, the outlet is in fluid connection with the second chamber and the third chamber to dispense a second volume of fluid. A method of operating a dispensing cap is also provided.

25 Claims, 24 Drawing Sheets

(58) Field of Classification Search
USPC ....... 222/145.1, 145.4, 145.5, 145.7, 568, 1, 222/23, 144.5, 134
See application file for complete search history.

(56) References Cited

U.S. PATENT DOCUMENTS

| | | | |
|---|---|---|---|
| 3,148,801 A | 9/1964 | Radeloff et al. | |
| 3,163,335 A | 12/1964 | Chappell | |
| 3,237,816 A * | 3/1966 | Anderson | G01F 11/12 222/450 |
| 3,402,860 A | 9/1968 | Torongo, Jr. | |
| 3,419,187 A | 12/1968 | Barzanic | |
| 3,844,454 A | 10/1974 | Buchtel | |
| 4,079,859 A | 3/1978 | Jennings | |
| 4,141,472 A | 2/1979 | Spitzer et al. | |
| 4,314,657 A | 2/1982 | Perakis et al. | |
| 4,449,651 A | 5/1984 | Roder et al. | |
| 4,576,593 A | 3/1986 | Mommer | |
| 4,579,256 A * | 4/1986 | Heimlich | G01F 11/14 222/162 |
| 4,807,785 A | 2/1989 | Pritchett | |
| 4,811,871 A | 3/1989 | Wass et al. | |
| 4,830,226 A | 5/1989 | Kong | |
| 4,886,193 A | 12/1989 | Wassilieff | |
| 4,946,080 A | 8/1990 | Vesborg | |
| 4,971,226 A | 11/1990 | Donoghue | |
| 5,078,305 A | 1/1992 | Glynn et al. | |
| 5,148,953 A | 9/1992 | Fudalla | |
| 5,186,366 A | 2/1993 | Meisner et al. | |
| 5,251,792 A | 10/1993 | Sheen | |
| 5,253,788 A | 10/1993 | Vandromme et al. | |
| 5,323,938 A | 6/1994 | Ceccarelli et al. | |
| 5,381,930 A | 1/1995 | Kalabakas | |
| 5,411,186 A * | 5/1995 | Robbins, III | B65D 47/0814 222/442 |
| 5,584,420 A | 12/1996 | Awada et al. | |
| 5,833,124 A | 11/1998 | Groves et al. | |
| 5,881,716 A | 3/1999 | Wirch et al. | |
| 5,988,434 A | 11/1999 | Keil et al. | |
| 6,068,165 A | 5/2000 | Minihane et al. | |
| 6,216,919 B1 | 4/2001 | Ae' et al. | |
| 6,276,572 B1 | 8/2001 | Evans | |
| 6,357,627 B1 | 3/2002 | Pasbrig et al. | |
| 6,357,630 B1 | 3/2002 | Sperna Weiland | |
| 6,675,845 B2 | 1/2004 | Volpenheim et al. | |
| 6,796,343 B2 | 9/2004 | Kelsey et al. | |
| 7,472,810 B2 | 1/2009 | Amir | |
| 7,516,738 B2 | 4/2009 | Scarrott et al. | |
| 7,621,273 B2 | 11/2009 | Morton et al. | |
| 7,757,688 B2 | 7/2010 | Scarrott et al. | |
| 8,028,865 B2 | 10/2011 | De Jonge | |
| 8,122,849 B2 | 2/2012 | Clarke et al. | |
| 2004/0011830 A1 | 1/2004 | Kim | |
| 2004/0050882 A1* | 3/2004 | Robbins | G01F 11/28 222/442 |
| 2005/0029286 A1* | 2/2005 | Bergin | G01F 11/38 222/1 |
| 2006/0091163 A1 | 5/2006 | Peng et al. | |
| 2006/0255074 A1 | 11/2006 | Amir | |
| 2007/0210119 A1 | 9/2007 | Alsberg | |
| 2007/0221683 A1 | 9/2007 | Hohmann et al. | |
| 2009/0302063 A1 | 12/2009 | Maas et al. | |
| 2010/0147903 A1 | 6/2010 | Farside | |
| 2011/0163132 A1 | 7/2011 | Moreau | |
| 2012/0024886 A1 | 2/2012 | Aviram | |
| 2012/0097712 A1 | 4/2012 | Esteve et al. | |
| 2012/0097714 A1 | 4/2012 | Hoefte et al. | |

FOREIGN PATENT DOCUMENTS

| | | |
|---|---|---|
| GB | 2394947 | 12/2004 |
| JP | 8026319 | 1/1996 |
| JP | 2012012085 | 1/2012 |
| NL | 1038405 | 5/2012 |
| WO | 9116238 | 10/1991 |
| WO | 01/36920 | 5/2001 |
| WO | 03025520 | 3/2003 |

OTHER PUBLICATIONS

Written Opinion, PCT/US2014/028769, Aug. 5, 2014.
International Preliminary Report on Patentability, PCT/US2014/028769, Sep. 24, 2015.
The Medi-Dose Group, <http://www.medidose.com> webpage available as early as Nov. 27, 1999.
EP14762470.4 Extended European Search Report dated Nov. 7, 2016 (7 pages).

* cited by examiner

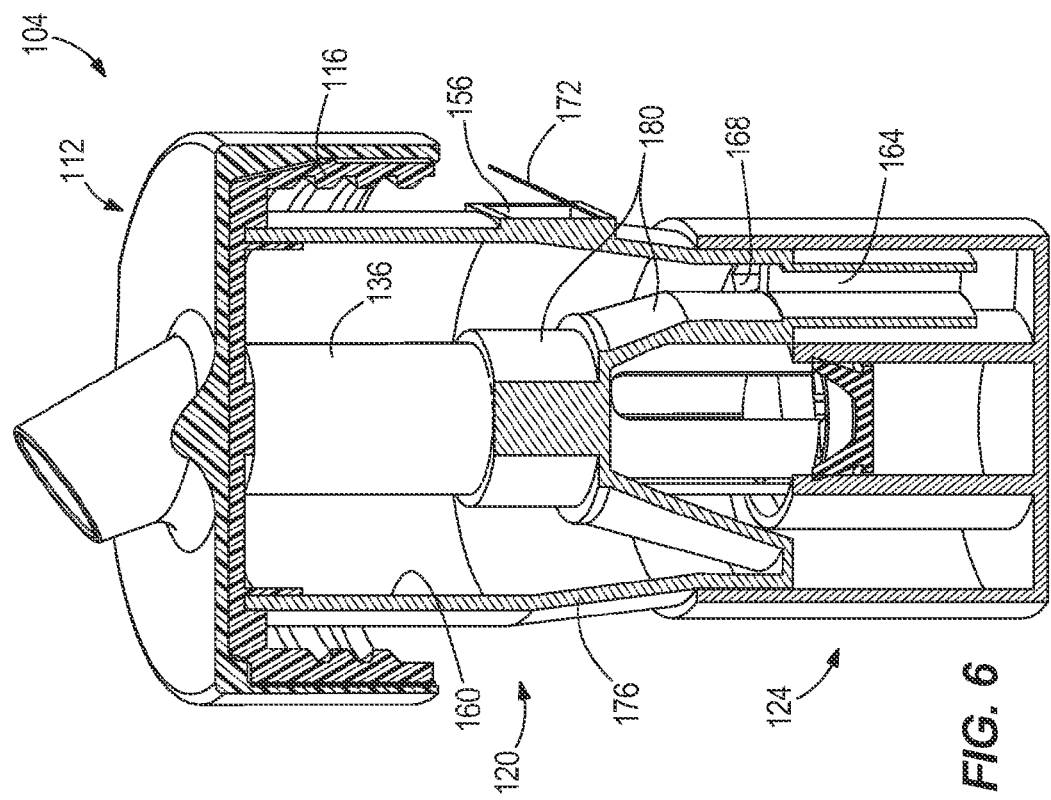
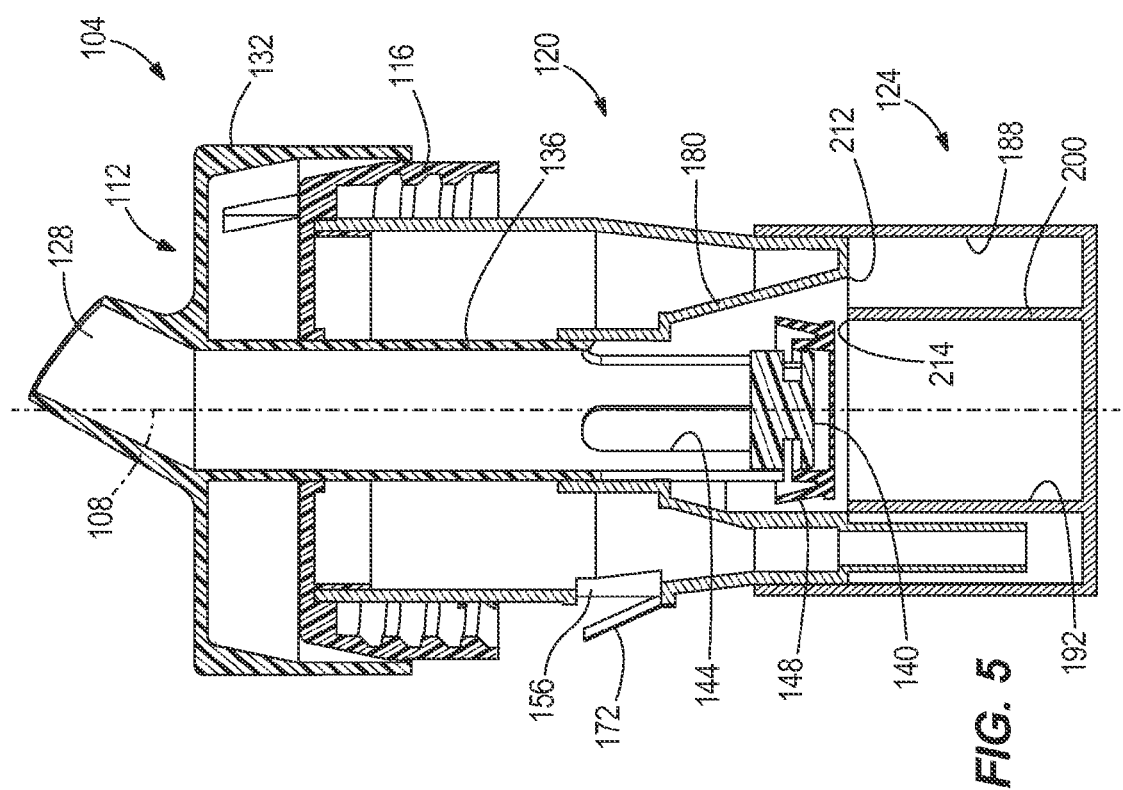

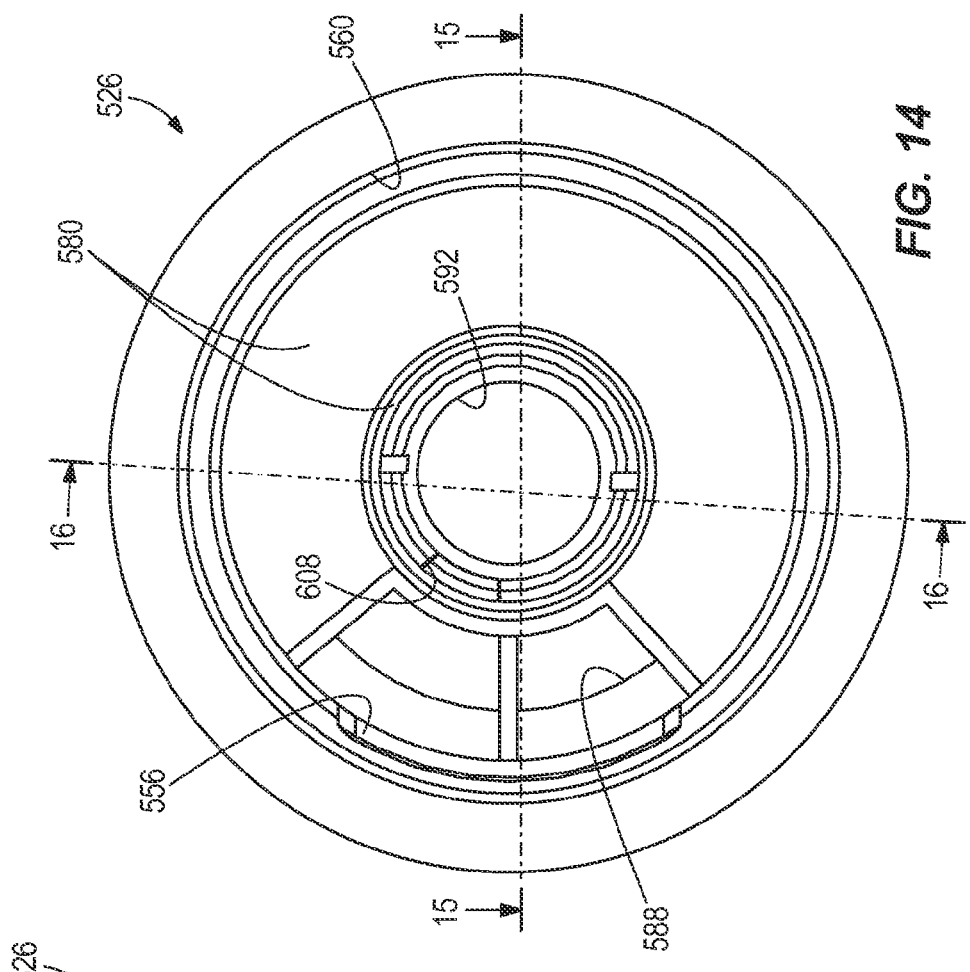
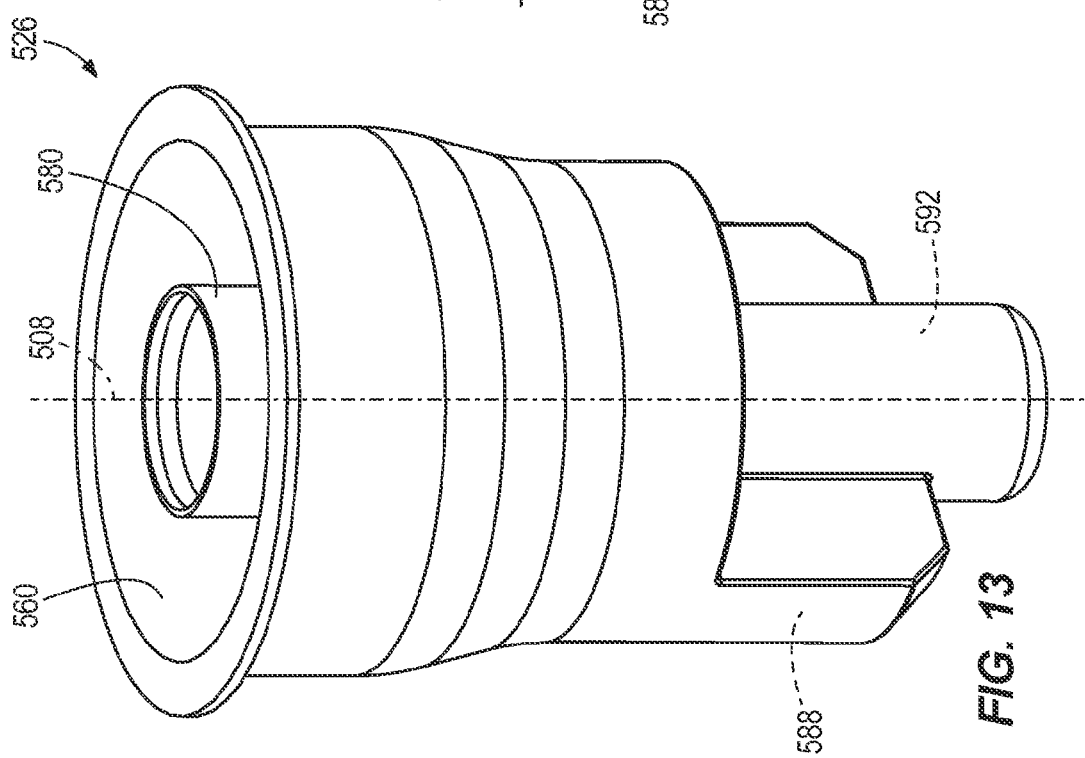

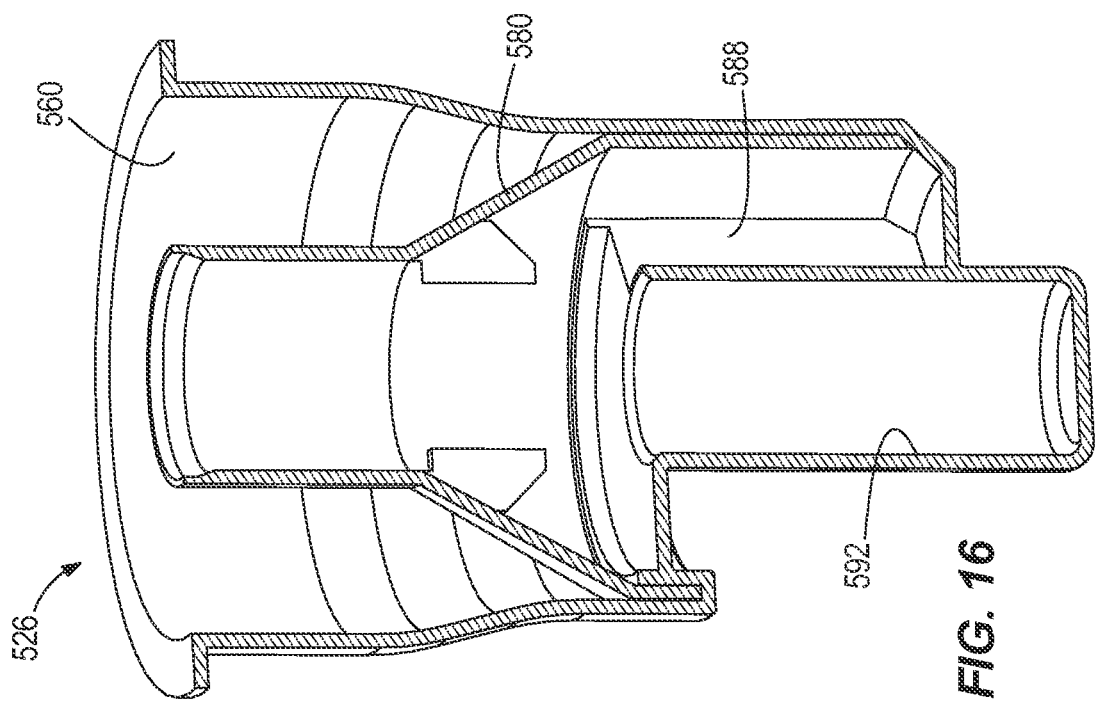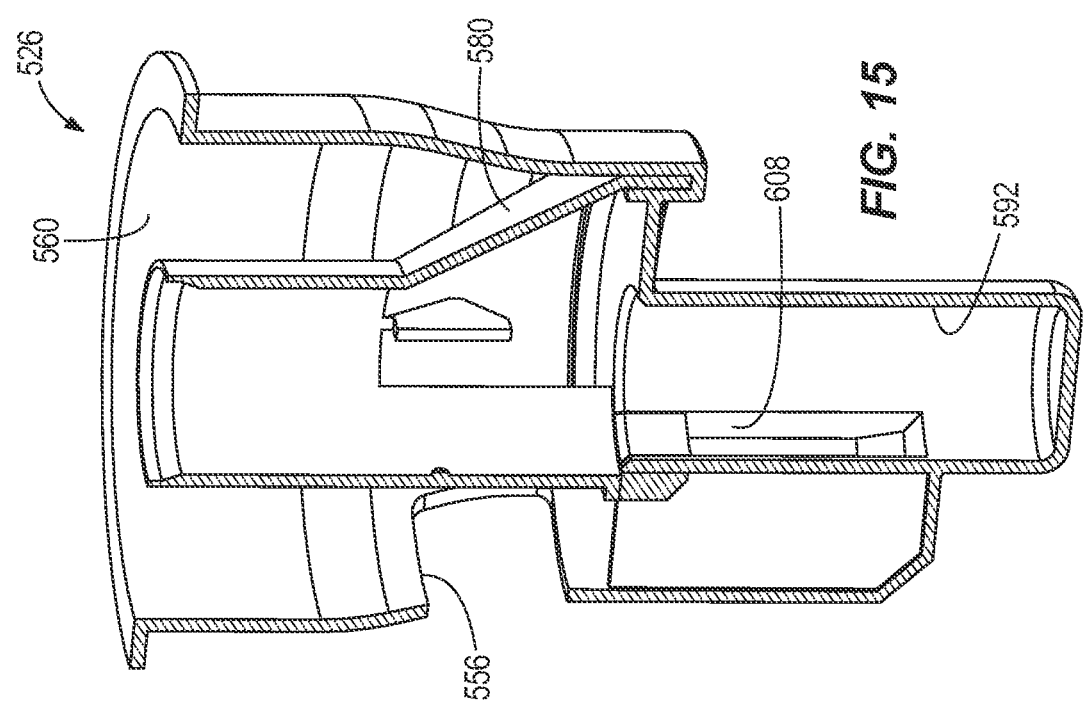

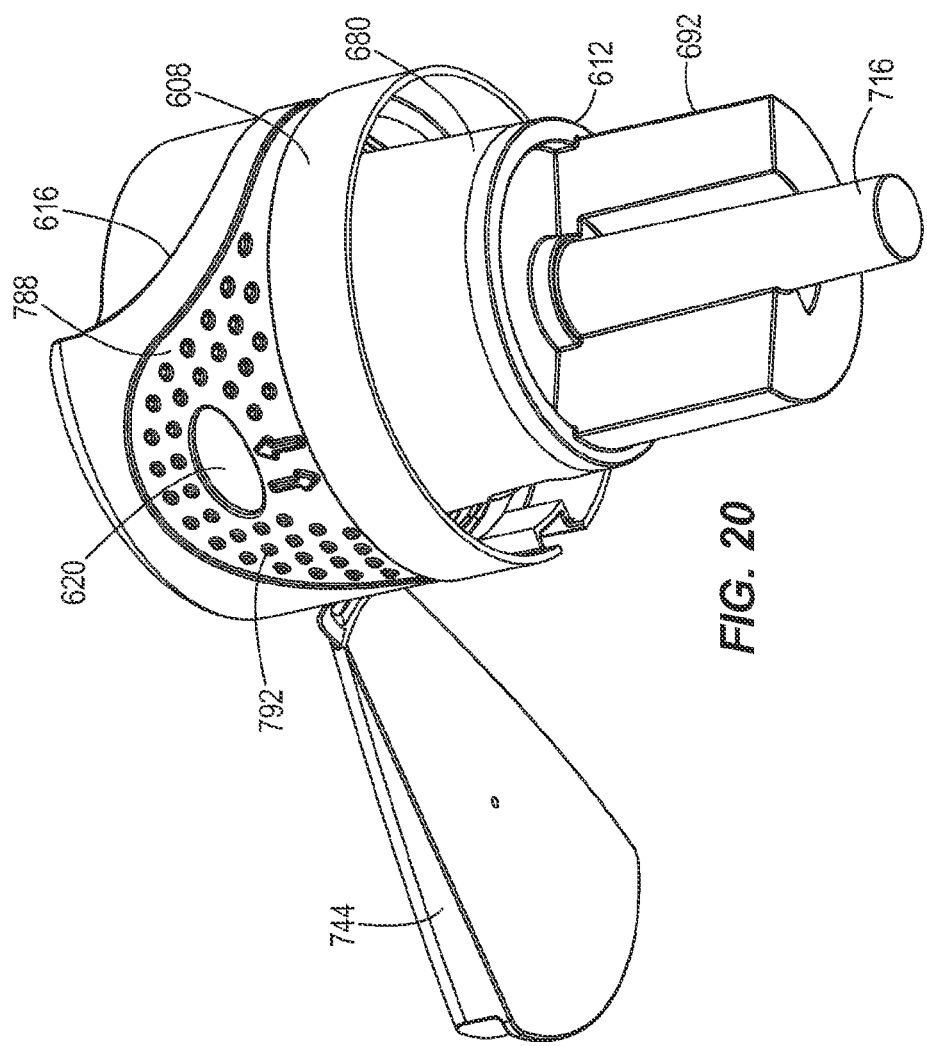
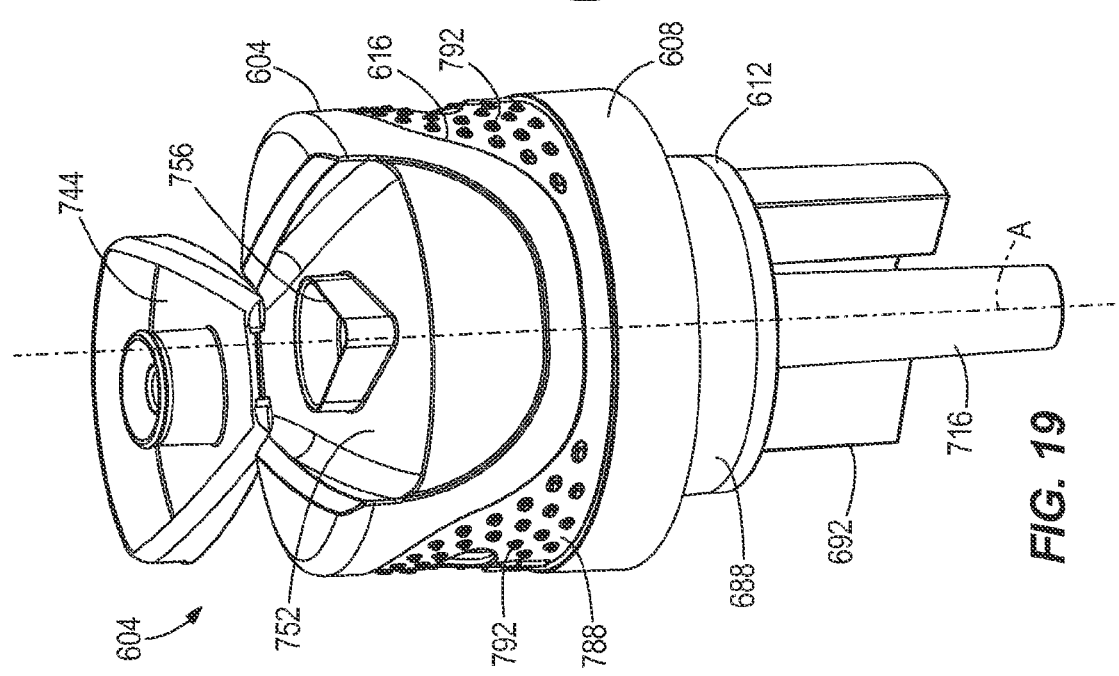

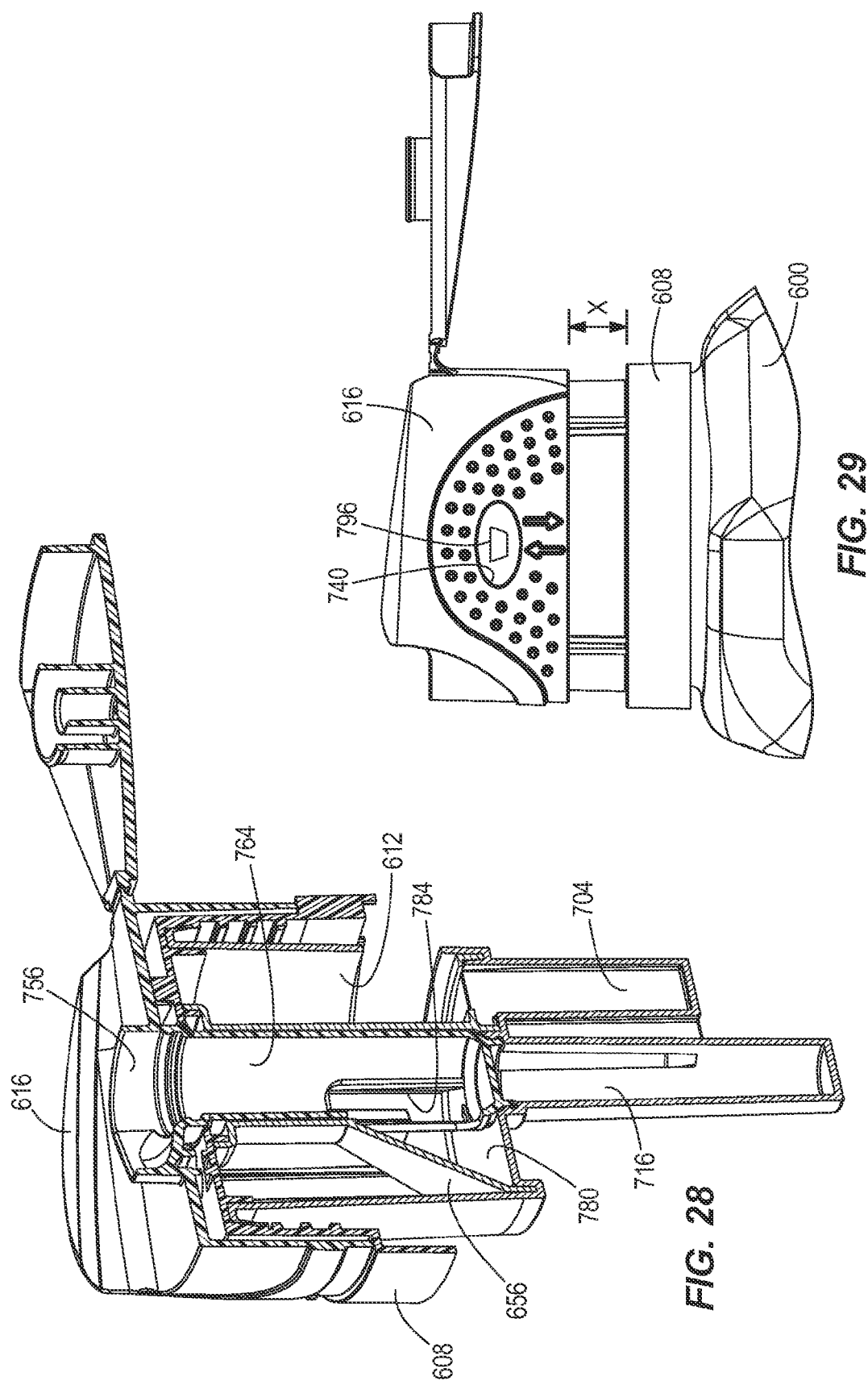

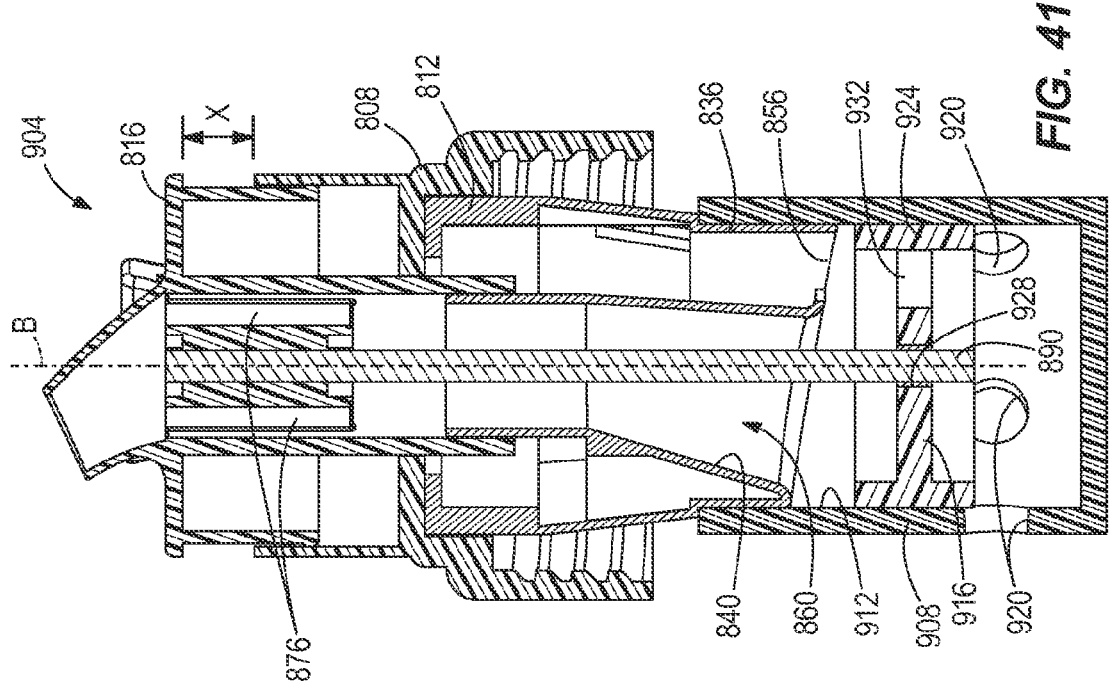
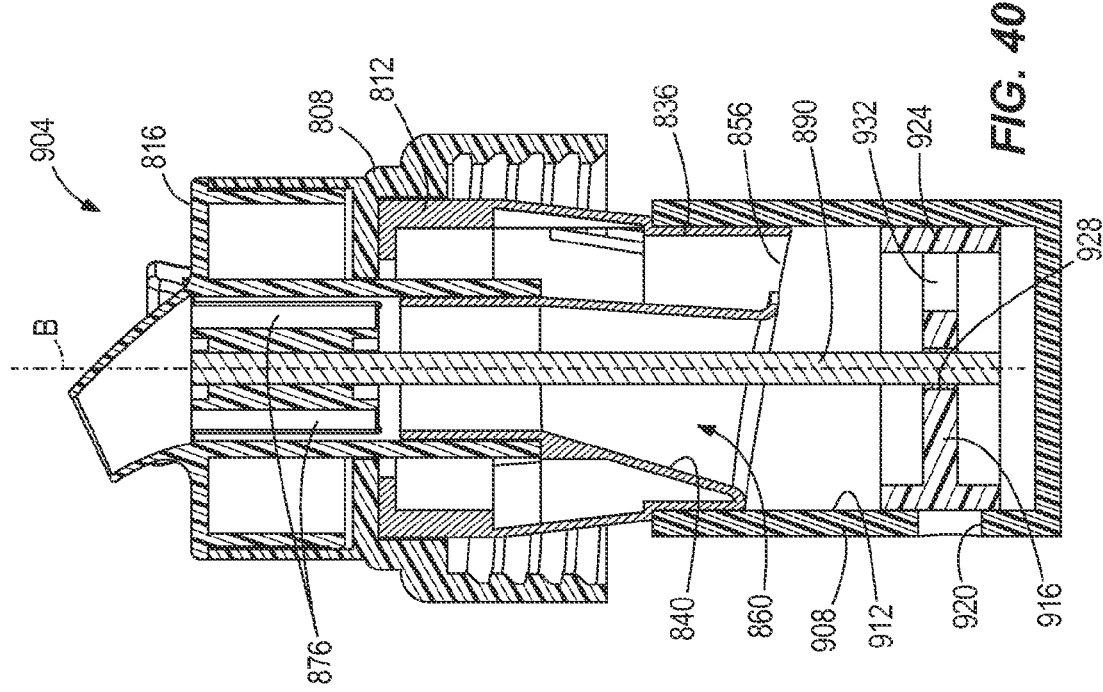

ADJUSTABLE DOSING CAP

BACKGROUND

The present invention relates to a dosing cap for a container, and more particularly, to a dosing cap that is adjustable to dispense different amounts of fluid from the container.

SUMMARY

In one aspect, the invention provides a dosing cap including an upper housing portion that defines an inlet, a manifold that is in fluid communication with the inlet, a first outlet that is in fluid communication with the manifold, and a second outlet that is in fluid communication with the manifold. The dosing cap also includes a lower housing portion that has a first chamber in fluid communication with the first outlet and a second chamber in fluid communication with the second outlet. A lid is movable between a first position and a second position, and the lid is in fluid communication with the first chamber when the lid is in the first position. The lid is in fluid communication with the first chamber and the second chamber when the lid is in a second position.

In another aspect, the invention provides a dispensing cap including a first housing portion defining a first chamber, a lid coupled to the first housing and defining an outlet, the lid movable between a first position and a second position, a second housing portion defining a second chamber in fluid communication with the first chamber, the second housing portion further defining a third chamber separate from the second chamber, wherein when the lid is in the first position, the outlet is in fluid communication with the second chamber to dispense a first volume of fluid, and wherein when the lid in the second position, the outlet is in fluid connection with the second chamber and the third chamber to dispense a second volume of fluid.

In another aspect, the invention provides a method of operating a dispensing cap, including the steps of selectively actuating the dosing cap between a first position and a second position, the first position fluidly connecting a nozzle and a first measuring chamber, and the second position fluidly connecting the nozzle and both the first measuring chamber and a second measuring chamber, dispensing a chemical retained in one or both of the first and second measuring chambers, and refilling the dispensing cap while dispensing by permitting fluid communication between a fluid reservoir and a holding chamber defined by the dispensing cap, the holding chamber in fluid communication with the first and second measuring chambers.

In another aspect, the invention provides a dispensing cap including an upper housing portion defining an inlet, a manifold in fluid communication with the inlet, a first outlet in fluid communication with the manifold, and a second outlet in fluid communication with the manifold, a lower housing portion including a first chamber in fluid communication with the first outlet and a second chamber in fluid communication with the second outlet, and a lid movable between a first position and a second position, the lid being in fluid communication with the first chamber when the lid is in the first position, the lid being in fluid communication with the first chamber and the second chamber when the lid is in a second position.

In another aspect, the invention provides a dispensing cap including a first housing portion defining at least one chamber, a second housing portion coupled to the first housing portion, an actuator movable with respect to the second housing portion to and between first and second positions corresponding to first and second doses of fluid dispensed from the at least one chamber through the dispensing cap, wherein the first dose is different in size from the second dose, an indicator on one of the second housing portion and the actuator indicative of an amount or a relative amount of fluid that will be dispensed from the cap when the cap is inverted, and an aperture defined in another of the second housing portion and the actuator, wherein the indicator is visible through the aperture in the first position of the actuator, and is not visible through the aperture in the second position of the actuator.

In another aspect, the invention provides a dispensing cap including a housing defining a first chamber and a second chamber, the first chamber in fluid communication with the second chamber, an actuator coupled to the housing and carrying an outlet, the actuator movable about the housing between a first position and a second position, and a member extending from the actuator to a wall of the second chamber, the wall being movable with the actuator between the first and second positions to selectively adjust the volume of the second chamber.

Other aspects of the invention will become apparent by consideration of the detailed description and accompanying drawings.

BRIEF DESCRIPTION OF THE DRAWINGS

FIG. 5 is a cross section view of the cap of FIG. 3 taken along line 5-5 and illustrating the lid in a second position.

FIG. 6 is a cross-section view of the cap of FIG. 3 taken along line 6-6.

FIG. 13 is a perspective view of a housing of the cap of FIG. 11.

FIG. 14 is a top view of the housing of FIG. 13.

FIG. 15 is a cross-section view of the housing of FIG. 13 taken along line 15-15.

FIG. 16 is a cross-section view of the housing of FIG. 13 taken along line 16-16.

FIG. 19 is a perspective view of the cap of FIGS. 17 and 18.

FIG. 20 is a perspective view of the cap of FIG. 19 taken from underneath the cap.

FIG. 28 is a cross-sectional perspective view of the cap of FIG. 19 taken along line 28-28 illustrating the cap with the actuator in the first position.

FIG. 29 is a side view of the cap illustrating the actuator in a second position.

FIG. 40 is a section view of the cap of FIG. 39 taken along line 40-40 and illustrating a cap base, a reservoir, and an actuator in a first position.

FIG. 41 is a section view of the cap of FIG. 39 illustrating the actuator in a second position.

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways.

DETAILED DESCRIPTION

Figure 1:
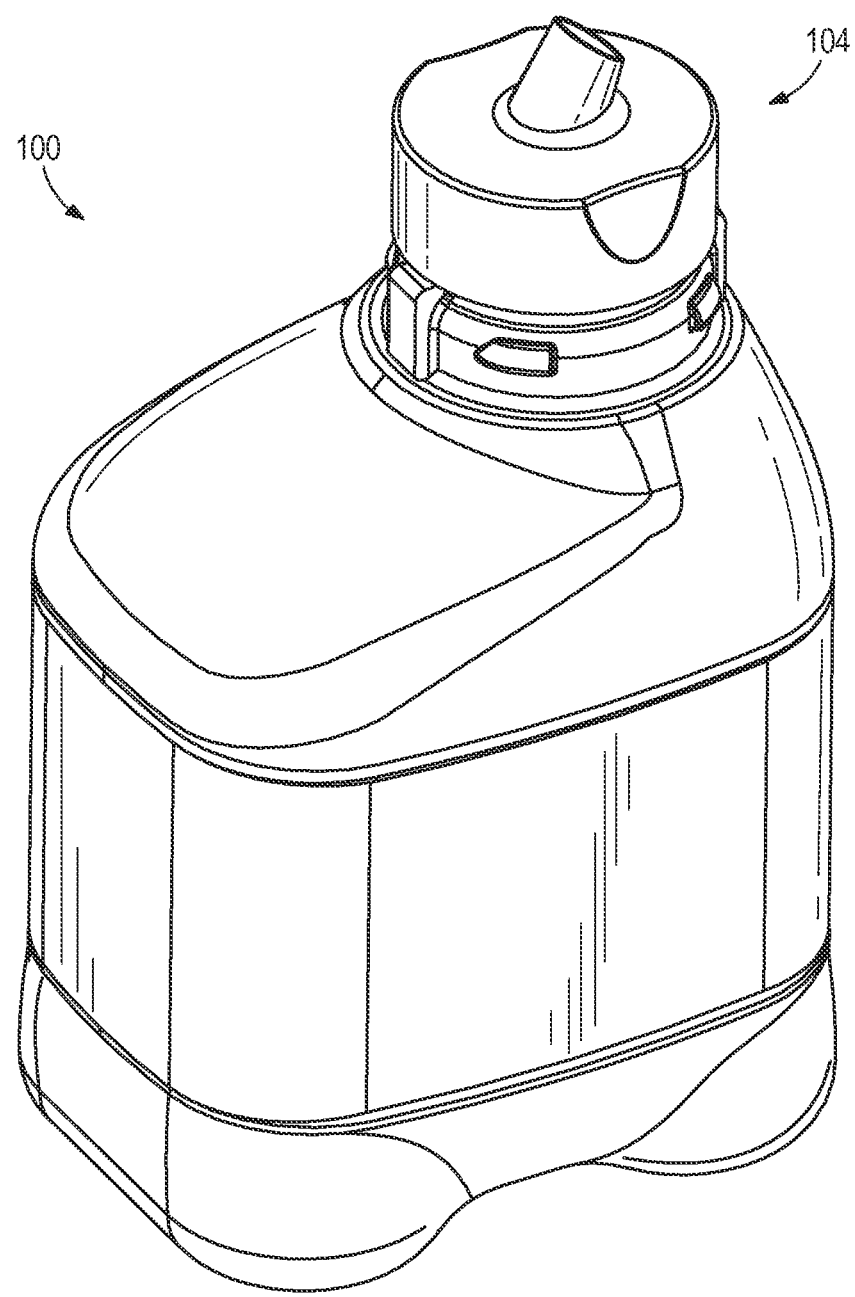
FIG. 1 is a perspective view of a container and a dispensing cap embodying the invention.
Figure 2:
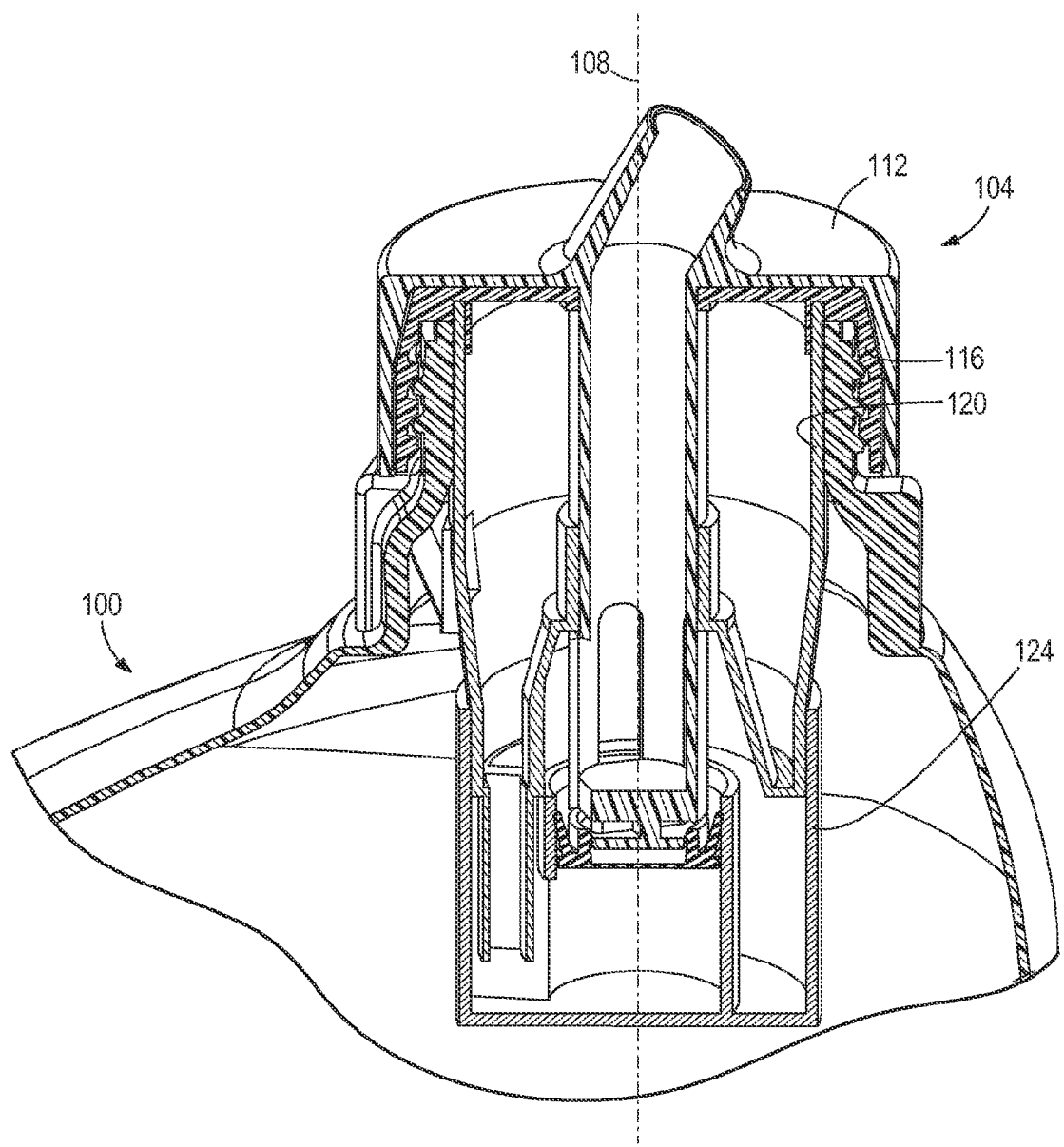
FIG. 2 is a cross-section view of the container and dispensing cap of FIG. 1.
Figure 3:
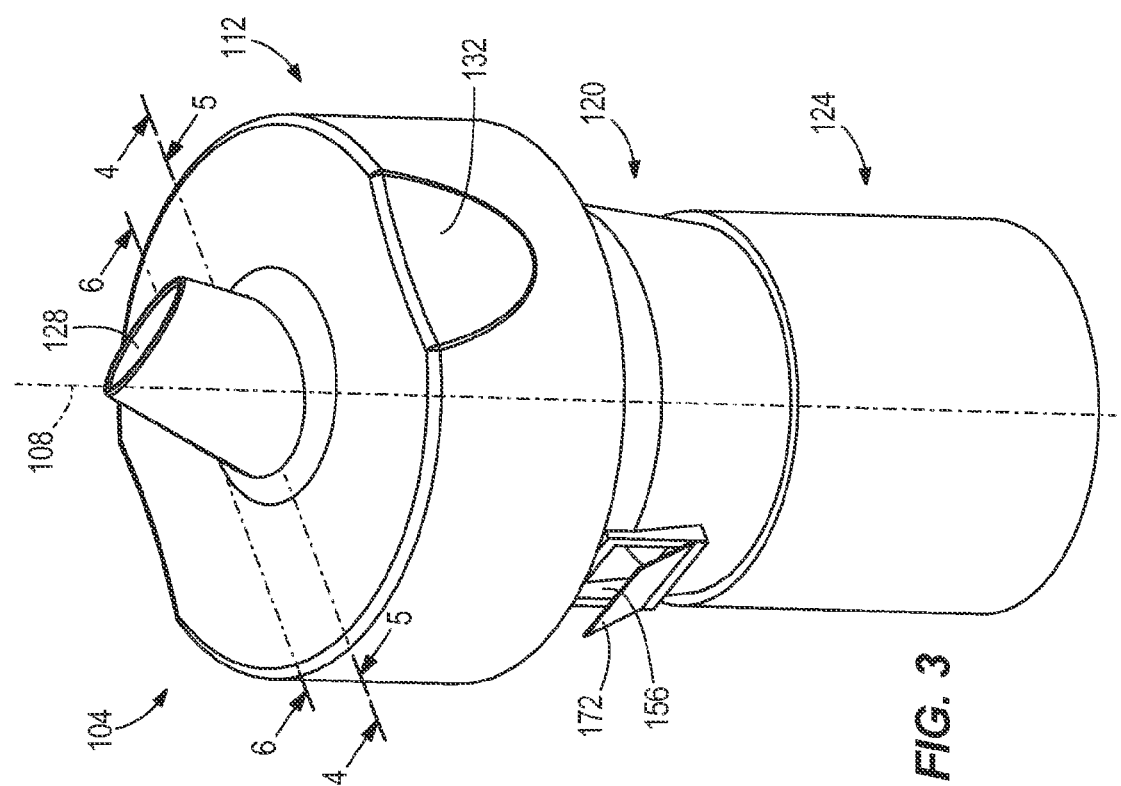
FIG. 3 is a perspective view of the dispensing cap.

FIG. 1 illustrates a chemical container 100 including a dosing cap or chemical distribution cap 104 for dispensing chemical disposed within the container 100. The chemical may include, for example, a fluid or a powder that is administered for medical purposes. Referring to FIGS. 2 and 3, the cap 104 defines a longitudinal axis 108 and includes a lid or cap actuator 112 (hereinafter referred to as the actuator 112 for purposes of description only), an intermediate cap or cap base 116 (FIG. 2), a first or upper housing portion 120 coupled to the cap base 116, and a second or lower housing portion 124 coupled to the first housing portion 120. In the illustrated embodiment, the cap base 116 is removably coupled to the container 100 by a threaded connection.

Figure 4:
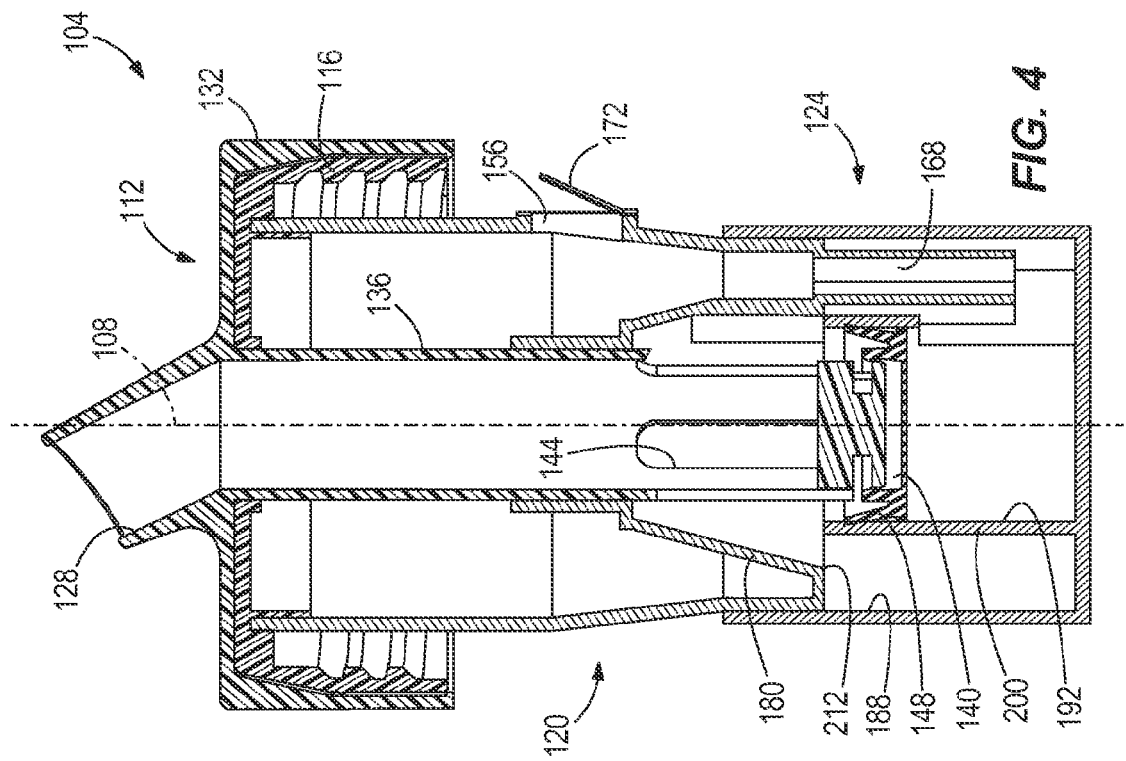
FIG. 4 is a cross-section view of the cap of FIG. 3 taken along line 4-4 and illustrating a lid in a first position.

Referring to FIGS. 4 and 5, the actuator 112 is coupled and movable relative to the cap base 116 between a first position (FIG. 4) and a second position (FIG. 5). In some embodiments, the actuator 112 is slidable relative to the cap base 116 so that the actuator 112 is moved by translation along the longitudinal axis 108. In other embodiments, the actuator 112 may be rotatably coupled to the cap base 116. The actuator 112 includes an orifice or nozzle 128, an actuating surface 132 adapted to be gripped or manipulated by a user to move the actuator 112 between the first position and the second position, and a plunger or elongated tube 136 extending between the nozzle 128 and a tube end 140. In the illustrated embodiment, the tube 136 is concentric with the longitudinal axis 108 of the cap 104. The interior of the tube 136 is in fluid communication with the nozzle 128 and includes apertures 144 and a seal 148 extending around the perimeter of the tube end 140. As used herein, "fluid communication" refers to the ability of fluids and solid particulate substances, such as powders, to be transported between two spaces.

Figure 8:
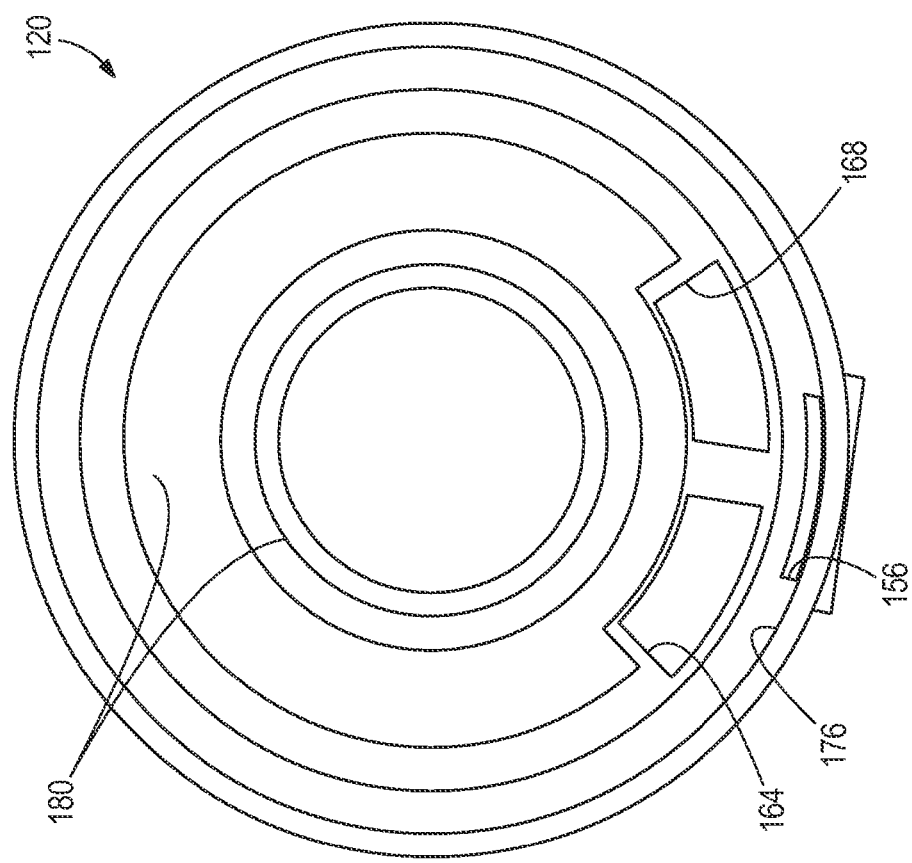
FIG. 8 is a top view of the upper housing portion of FIG. 7.
Figure 7:
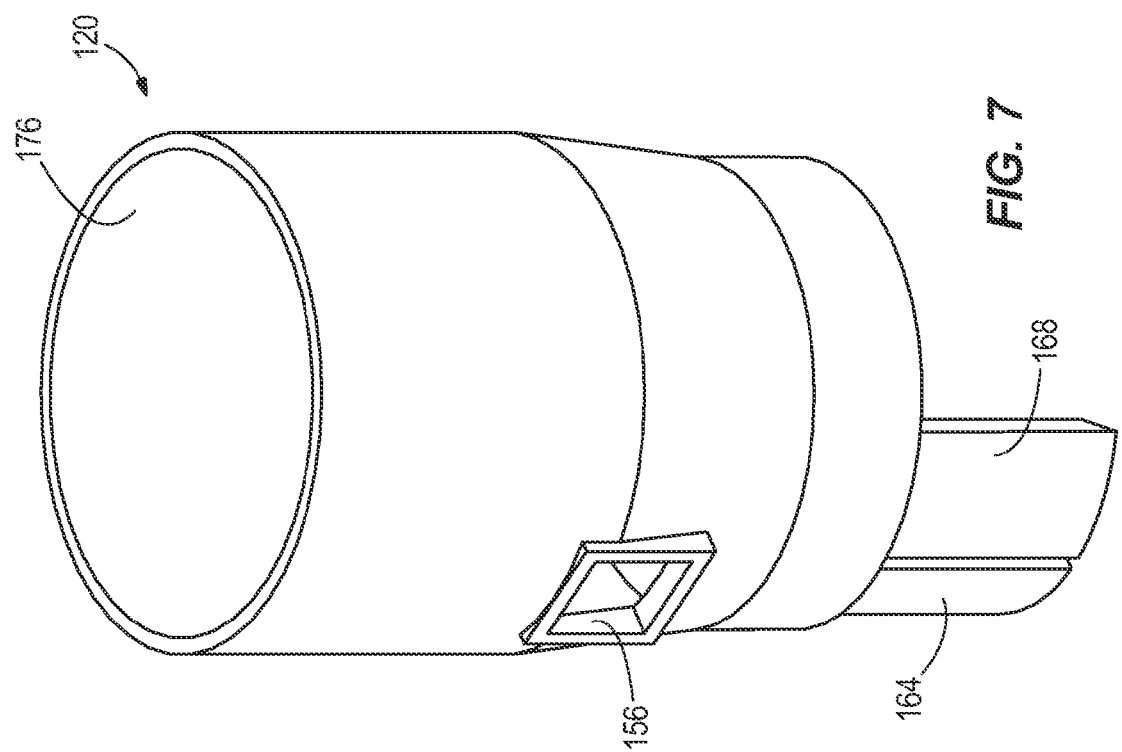
FIG. 7 is a perspective view of an upper housing portion of the dispensing cap.

As shown in FIGS. 6-8, the upper housing portion 120 includes a window or inlet 156, a holding chamber 160 in fluid communication with the inlet 156, a first outlet 164 in fluid communication with the holding chamber 160, and a second outlet 168 in fluid communication with the holding chamber 160 (FIG. 6). The first and second outlets 164, 168 may be collectively referred to herein as a manifold. The manifold may facilitate the flow of fluid from holding chamber 160 to first and second outlets 164, 168. The manifold may be provided in one or more additional embodiments disclosed herein. In the illustrated embodiment, the inlet 156 includes a flap 172 (FIG. 6) that is movable between an open position and a closed position. Also, the illustrated upper housing portion 120 further includes a generally cylindrical outer wall 176 (shown with a portion slightly tapered) and an inner wall 180 extending around a portion of the elongated tube 136 (FIG. 6). As shown in FIG. 6, the holding chamber 160 is defined by the volume between the walls defined by the cap base 116 and the outer wall 176, and the walls defined by the elongated tube 136 and the inner wall 180.

Figure 10:
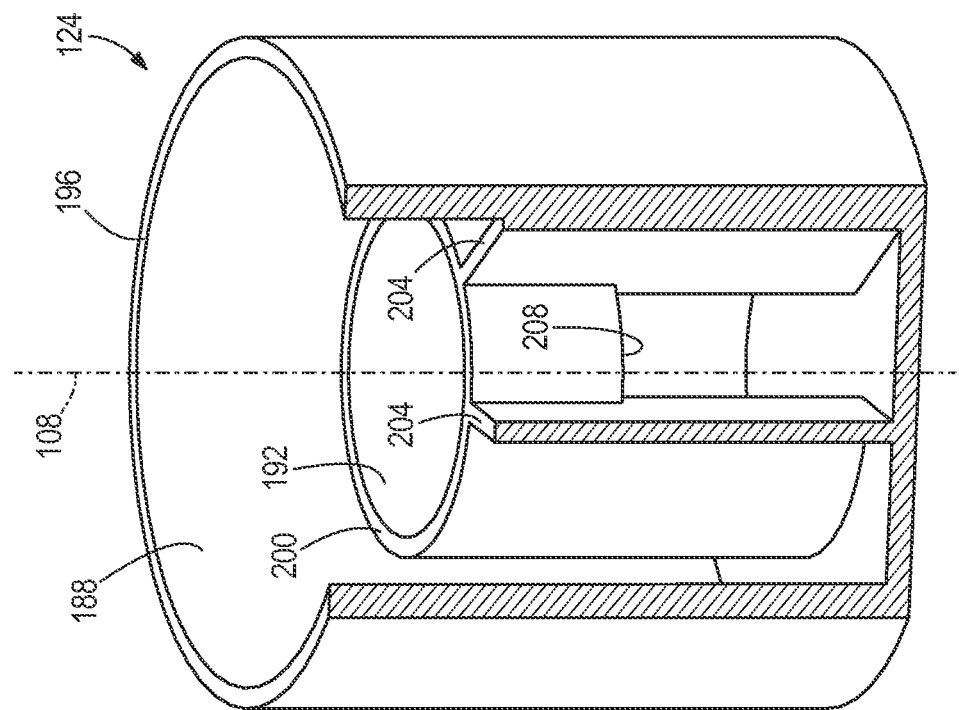
FIG. 10 is a partial cross-section view of the lower housing portion of FIG. 9 taken along line 10-10.
Figure 9:
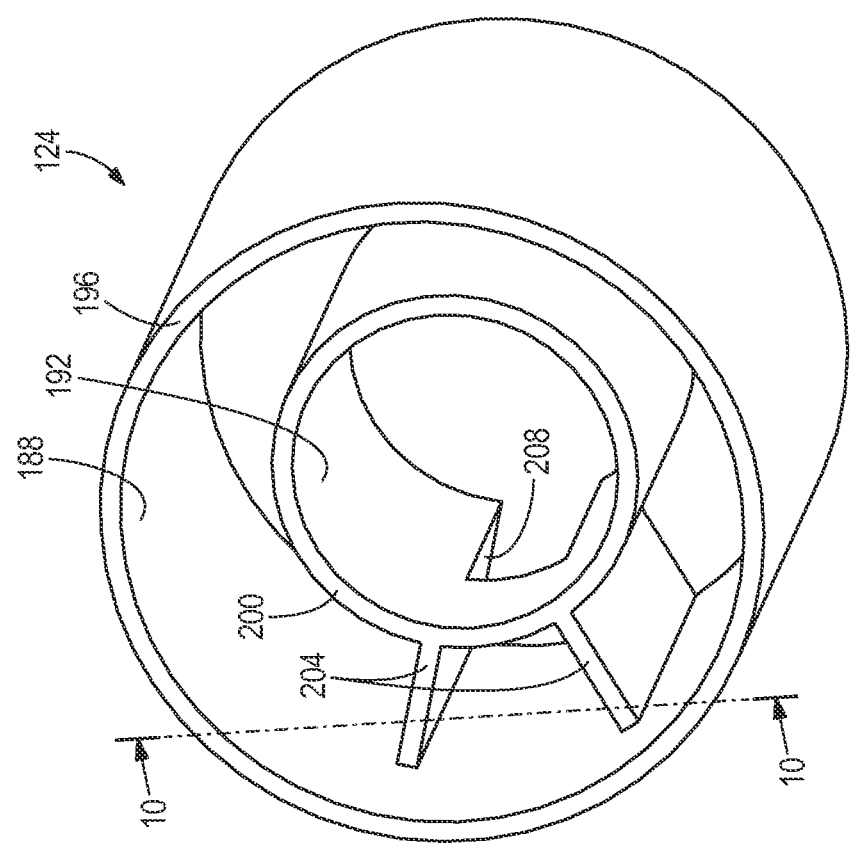
FIG. 9 is a perspective view of a lower housing portion of the dispensing cap.

Referring now to FIGS. 9 and 10, the lower housing portion 124 includes a first measuring chamber 188 in fluid communication with the first outlet 164 (FIG. 7) and a second measuring chamber 192 in fluid communication with the second outlet 168. In some embodiments, the lower housing portion 124 includes a cylindrical outer wall 196, a cylindrical inner wall 200 concentric with the outer wall 196, and two partitions 204 extending between the outer wall 196 and the inner wall 200. The second measuring chamber 192 is generally defined by the volume within the inner wall 200. A portion of the inner wall 200 between the partitions 204 includes a port 208. The second outlet 168 of the upper housing portion 120 is received between the partitions 204. The port 208 provides fluid communication between the second outlet 168 and the second measuring chamber 192. The first measuring chamber 188 is defined by the volume between the outer wall 196 and the inner wall 200, excluding the space between the partitions 204.

In some embodiments, the second measuring chamber 192 is centered on the longitudinal axis 108 and the first measuring chamber 188 extends at least partially around the second measuring chamber 192. The first measuring chamber 188 and the second measuring chamber 192 have substantially the same volume. In other embodiments, the first measuring chamber 188 and the second measuring chamber 192 may be arranged in a different manner or have different volumes.

Referring again to FIG. 4, when the actuator 112 is in the first position, the tube end 140 is positioned within the second measuring chamber 192 such that the seal 148 engages the inner wall 200 of the lower housing portion 124. In this position, the interior of the tube 136 is in fluid communication with the first measuring chamber 188 via the apertures 144 and an opening 212 between the inner wall 180 of the upper housing portion 120 and the inner wall 200 of the lower housing portion 124. The seal 148 prevents communication between the second measuring chamber 192 and the interior of the tube 136.

As shown in FIG. 5, when the actuator 112 is moved to the second position (illustrated as vertically above the first position), the apertures 144 are sized to maintain fluid communication between the interior of the tube 136 and the first measuring chamber 188. In addition, because the tube end 140 is removed from the second measuring chamber 192 and the seal 148 is disengaged from the inner wall 200, the second measuring chamber 192 is also in fluid communication with the interior of the tube 136 via the opening 212 between the inner wall 180 and the inner wall 200, and an opening 214 between the seal 148 and the inner wall 200. As such, both measuring chambers 188, 192 are in communication with the nozzle 128 in the second position.

During operation, the dispensing cap 104 is primed by first moving the container 100 to a substantially inverted (i.e. upside-down) orientation, such that a chemical can flow under a gravitational force from the container 100 into the holding chamber 160 via the inlet 156. The chemical fills the holding chamber 160 up to the level of the inlet 156 or another predetermined level. Next, the container 100 is moved into a substantially vertical (i.e. right-side-up) orientation such that chemical can flow under a gravitational force from the holding chamber 160 to both the first measuring chamber 188 and the second measuring chamber 192. The chemical fills the first measuring chamber 188 and the second measuring chamber 192 to a desired level. The flap 172 of the inlet 156 is configured to move from an open position to a closed position when the container 100 is in a horizontal orientation between the inverted and vertical orientations so that chemical does not pour through the dispensing cap 104.

A user selects the desired dose to be administered by moving the actuator 112 into either the first position or the second position. That is, if the actuator 112 is in the first position (FIG. 4), a first dose of chemical will be dispensed from the nozzle 128 according to the volume of the first measuring chamber 188. If, on the other hand, the actuator 112 is in the second position (FIG. 5), a second, larger dose of chemical will be dispensed from the nozzle 128 according to the combined volume of the first measuring chamber 188 and the second measuring chamber 192. After the desired dose is selected, the container 100 is inverted to permit chemical to pour from the nozzle 128. The holding chamber 160 is refilled with chemical when the container 100 is inverted, thereby priming the cap 104 for the subsequent dose as the current dose is evacuated from one or both of the measuring chambers 188, 192. In the illustrated embodiment, both measuring chambers 188, 192 can be filled at the same time with the nozzle in either position. In this embodiment, chemical in the second measuring chamber 192 can only flow between the second measuring chamber 192 and the holding chamber 160 until the actuator 112 is moved to the second position.

The dosing cap 104 continuously primes the holding chamber 160 for a subsequent dose each time a dose is dispensed. This permits the cap 104 to repeatedly dispense identical doses without requiring the user to actuate the actuator 112 between doses. Furthermore, after the initial inversion to prime the measuring chambers 188 and 192, either dose size is available to the user at any time. If the user desires to switch dose sizes, the cap 104 does not require the user to re-prime the measuring chambers 188, 192. That is, both measuring chambers 188, 192 are primed each time the cap 104 is inverted and either the first dose size or the second dose size is available to the user for the subsequent dose after each dose is administered. This simplifies dose selection and minimizes error because it is not necessary to dispose of a dose of the chemical and re-prime the cap 104 if the wrong dose size is initially selected.

FIGS. 11-16 illustrate another embodiment of the dispensing cap 504. Except as described below, the dispensing cap 504 is the same as the dispensing cap 104 described with regard to FIGS. 1-10, and common elements are given a reference numeral based on the reference numerals for FIGS. 1-10 plus 400.

Figure 11:
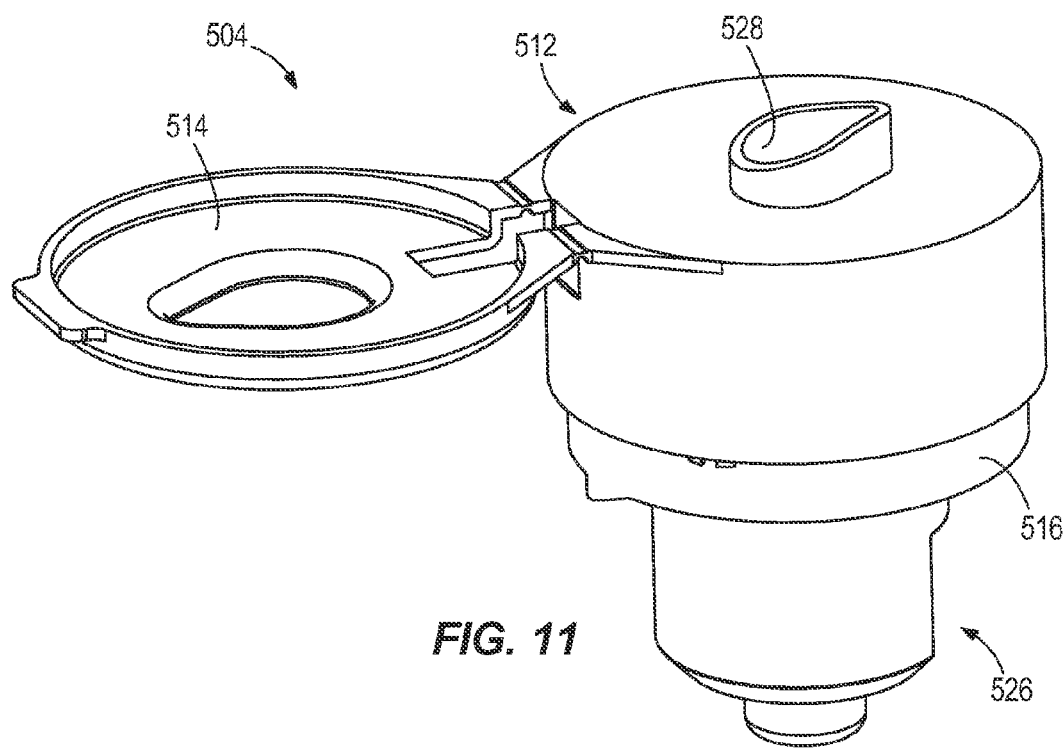
FIG. 11 is a perspective view of another dispensing cap embodying the invention.
Figure 12:
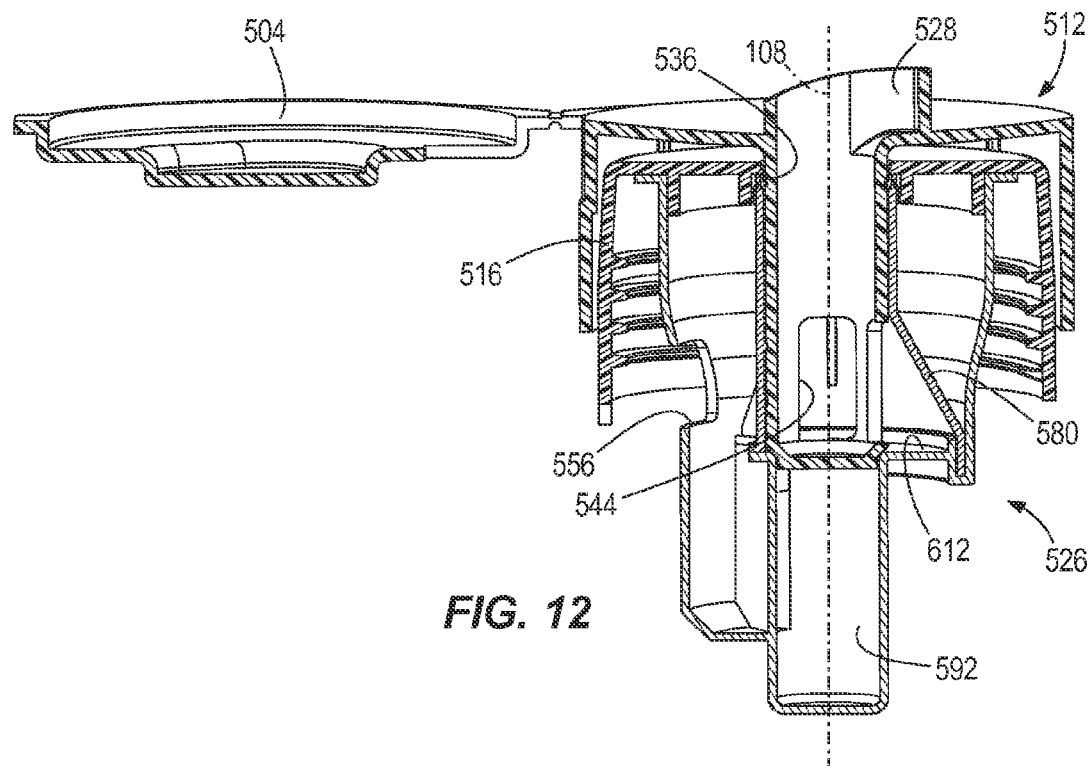
FIG. 12 is a cross-section view of the cap of FIG. 11 taken along line 12-12.

As shown in FIGS. 11 and 12, the dispensing cap 504 includes a lid 512 including a cover 514 that is movable to selectively cover a nozzle 528. In addition, as shown in FIGS. 12 and 13, an upper housing portion and a lower housing portion are integrally formed as a unitary housing 526. The housing 526 includes a first measuring chamber 588 that extends around a peripheral portion of the housing 526 and a second measuring chamber 592 that is defined by a generally cylindrical portion aligned with a longitudinal axis 508 of the cap 504. Referring to FIGS. 15 and 16, the second measuring chamber 592 extends below the first measuring chamber 588. Both the first measuring chamber 588 (FIG. 16) and the second measuring chamber 592 are in fluid communication with the holding chamber 560. In particular, the port 608 provides fluid communication between the holding chamber 560 and the second measuring chamber 592. Inlet or aperture 556 is in fluid communication with holding chamber 560.

When the lid 512 is in a first position, a tube 536 is in fluid communication with the first measuring chamber 588 only via apertures 544 and a space or opening 612 defined between an inner wall 580 of the housing 526 and above the second measuring chamber 592. When the actuator 512 is moved to the second position, the apertures 544 are sized to maintain fluid communication between the interior of the tube 536 and the first measuring chamber 588. Because the tube 536 is removed from the second measuring chamber 592, the second measuring chamber 592 is also in fluid communication with the interior of the tube 536 via the apertures 544 and the opening 612 and an opening (not shown) between the end of the tube 536 and the wall defining the measuring chamber 592. Generally, the user operates the lid 512 in a manner that is substantially similar to the operation of the dispensing cap 104 of FIGS. 1-10 in order to selectively place the second measuring chamber 588 in fluid communication with the nozzle 528.

FIGS. 17-32 illustrate another bottle or container 600 and a dosing cap 604 embodying the invention. A handle 606 facilitates manipulation of the container 600. With reference to FIGS. 17-23, the cap 604 defines a longitudinal axis A and includes an intermediate cap or cap base 608, an insert 610, a housing 612, and a lid or cap actuator 616 (hereinafter referred to as the "actuator 616" for purposes of description only) movably coupled to the cap base 608.

Figure 21:
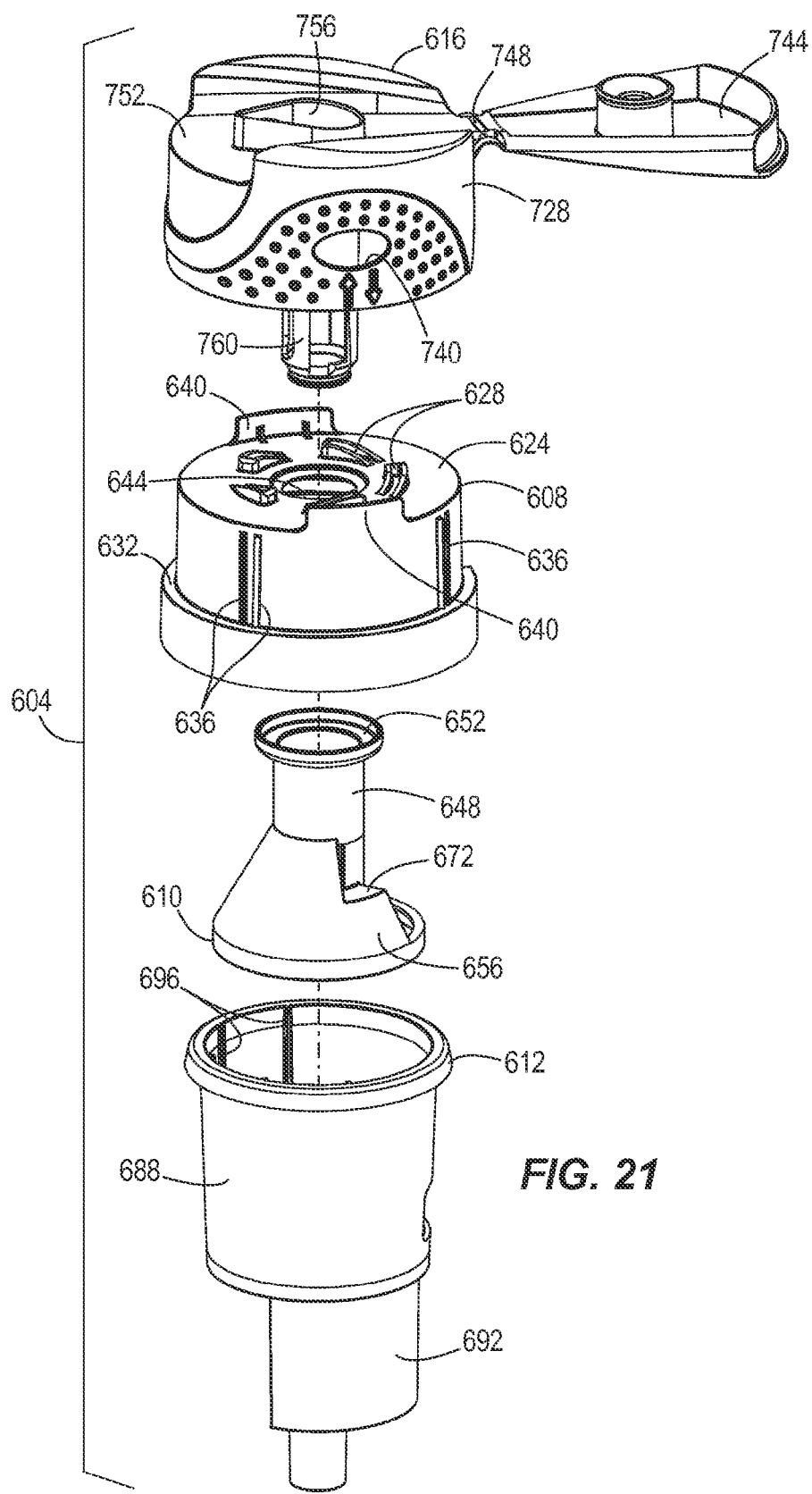
FIG. 21 is an exploded perspective view of the cap of FIG. 19, illustrating a cap base, an insert, a housing, and an actuator coupled to the cap.
Figure 22:
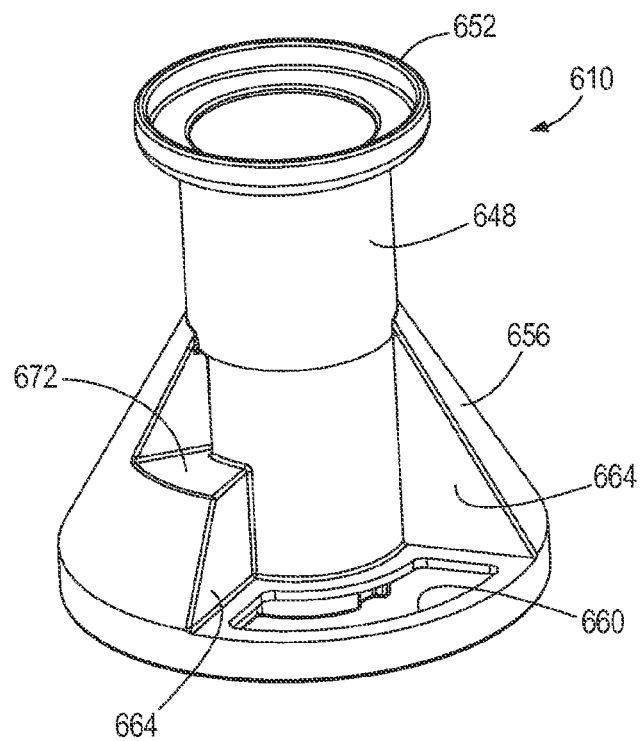
FIG. 22 is a perspective view of the insert of FIG. 21.
Figure 23:
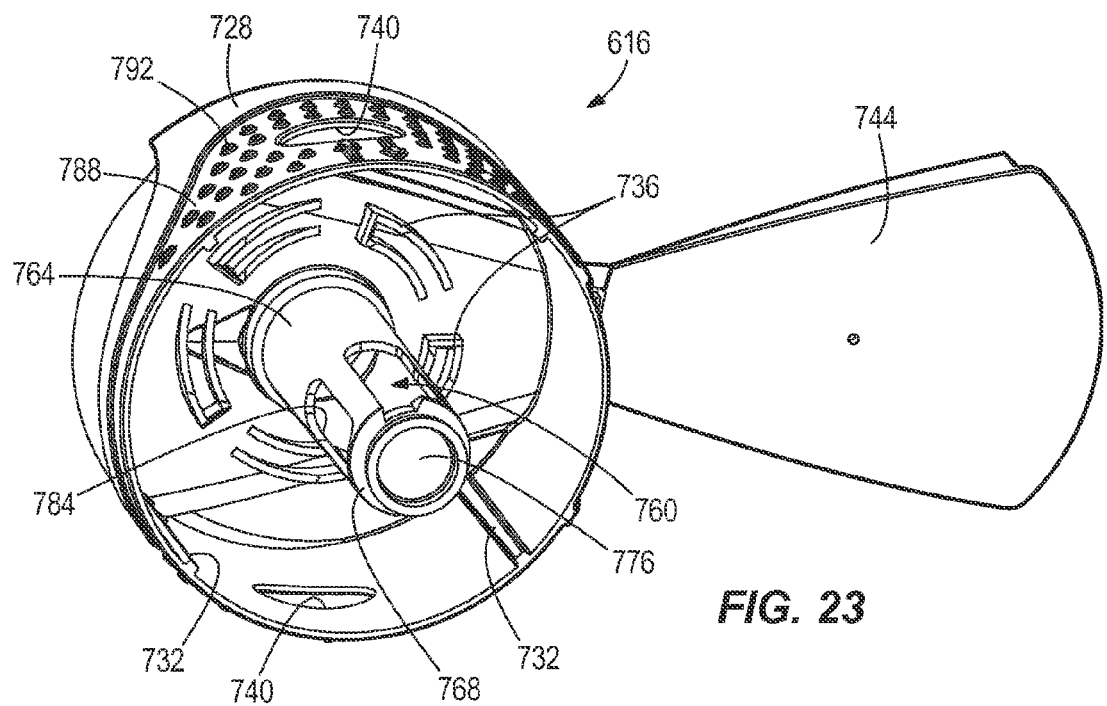
FIG. 23 is a perspective view of an underside of the actuator.
Figure 24:
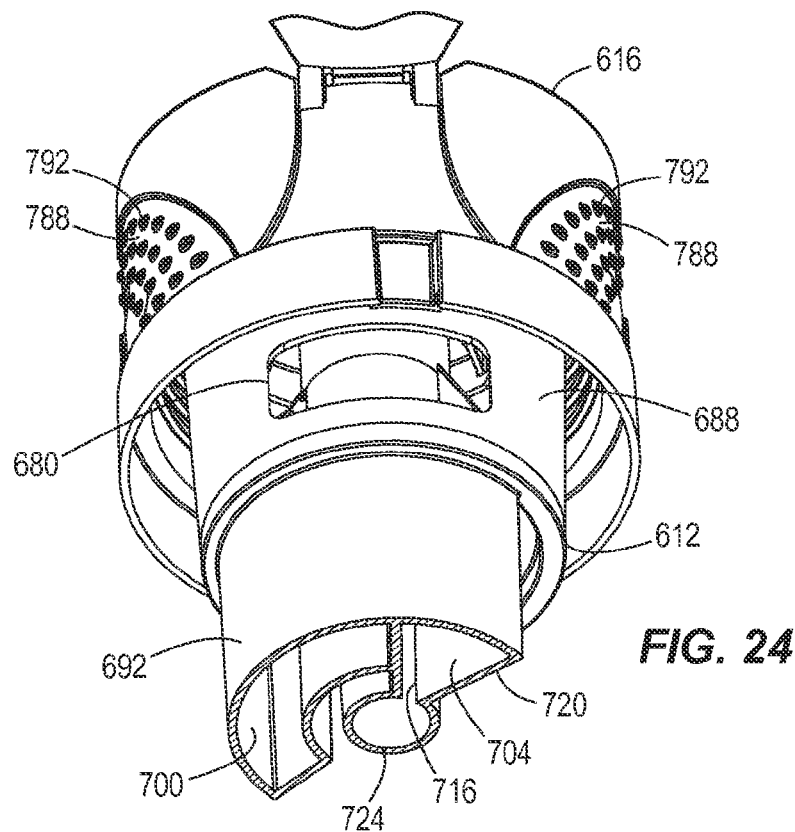
FIG. 24 is a cross-sectional perspective view of a portion of the cap illustrating the reservoir having two fluid chambers.
Figure 26:
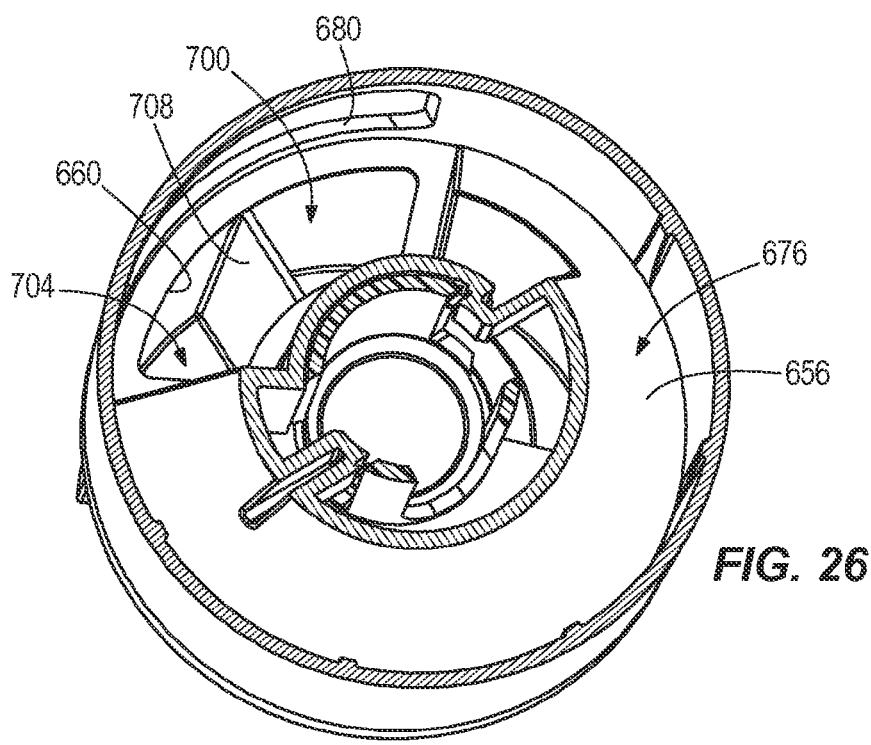
FIG. 26 is a cross-sectional perspective view of the cap of FIG. 19 taken along line 26-26.
Figure 27:
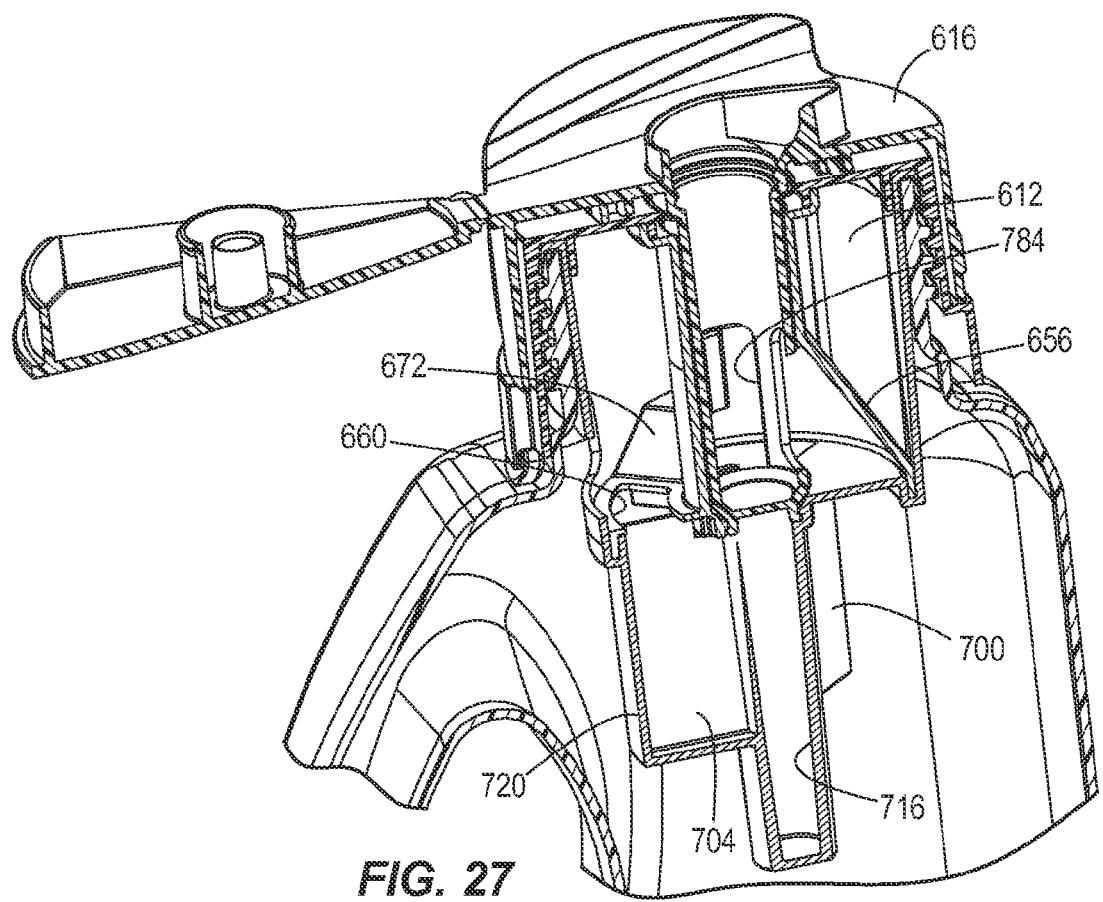
FIG. 27 is a cross-sectional perspective view of the cap and the container of FIG. 17 taken along line 27-27 and illustrating the actuator in a first position.
Figure 30:
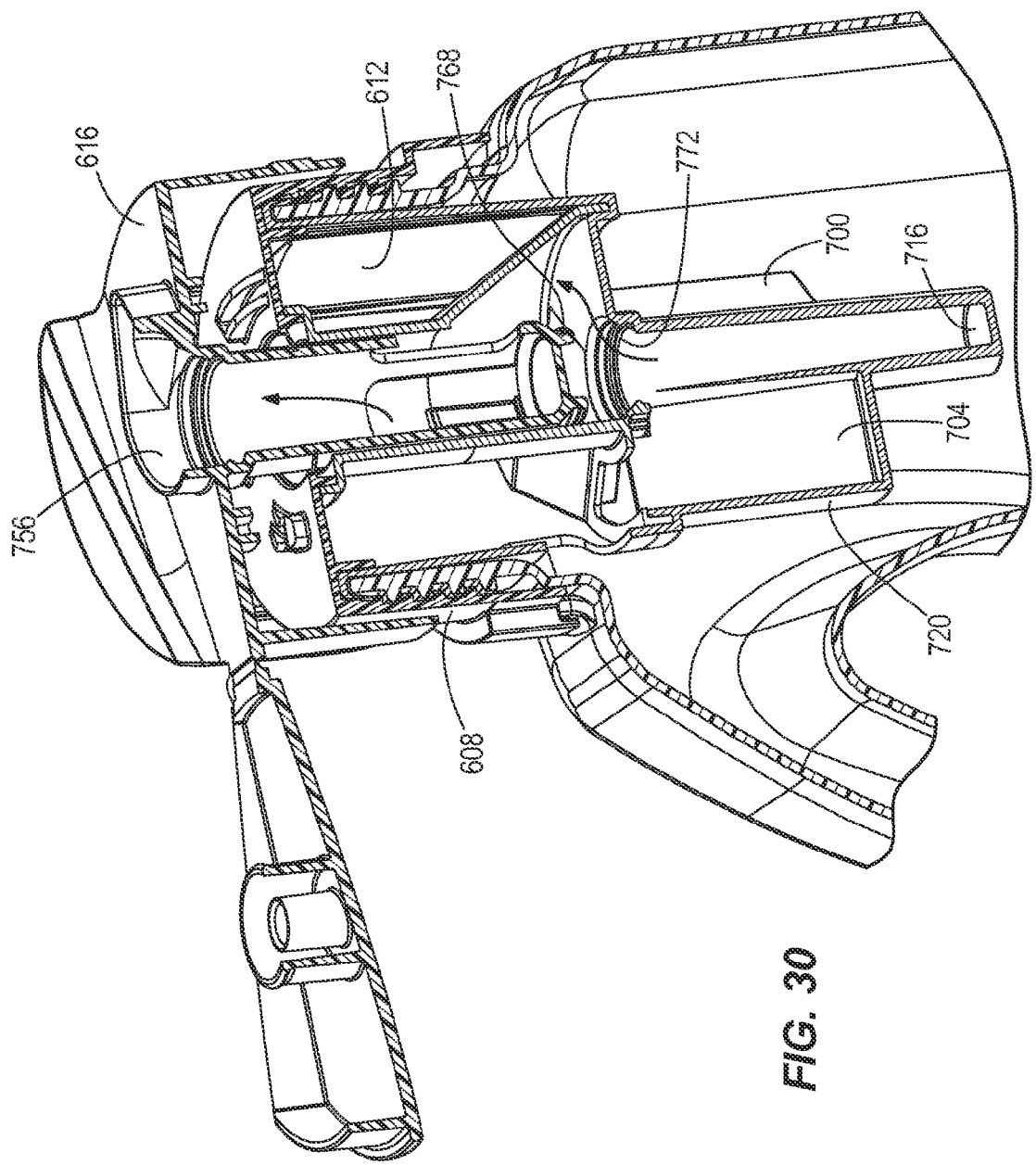
FIG. 30 is a cross-sectional perspective view illustrating the container and the cap with the actuator in the second position.
Figure 31:
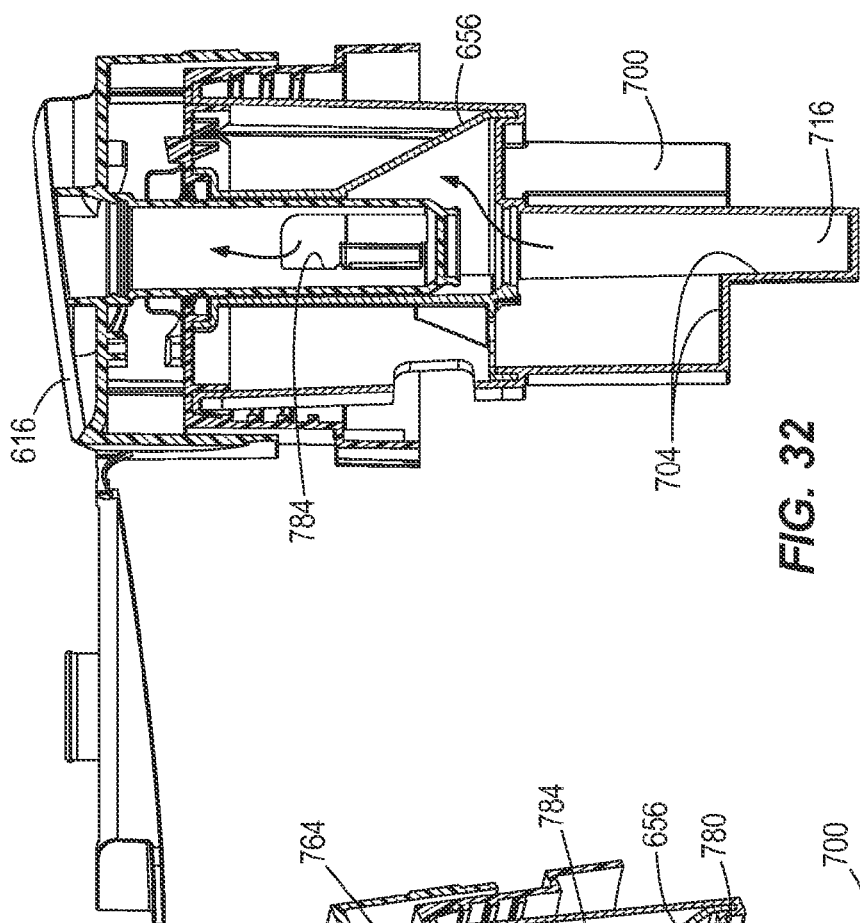
FIG. 31 is a cross-sectional perspective view of the cap illustrating the actuator in the second position.
Figure 32:
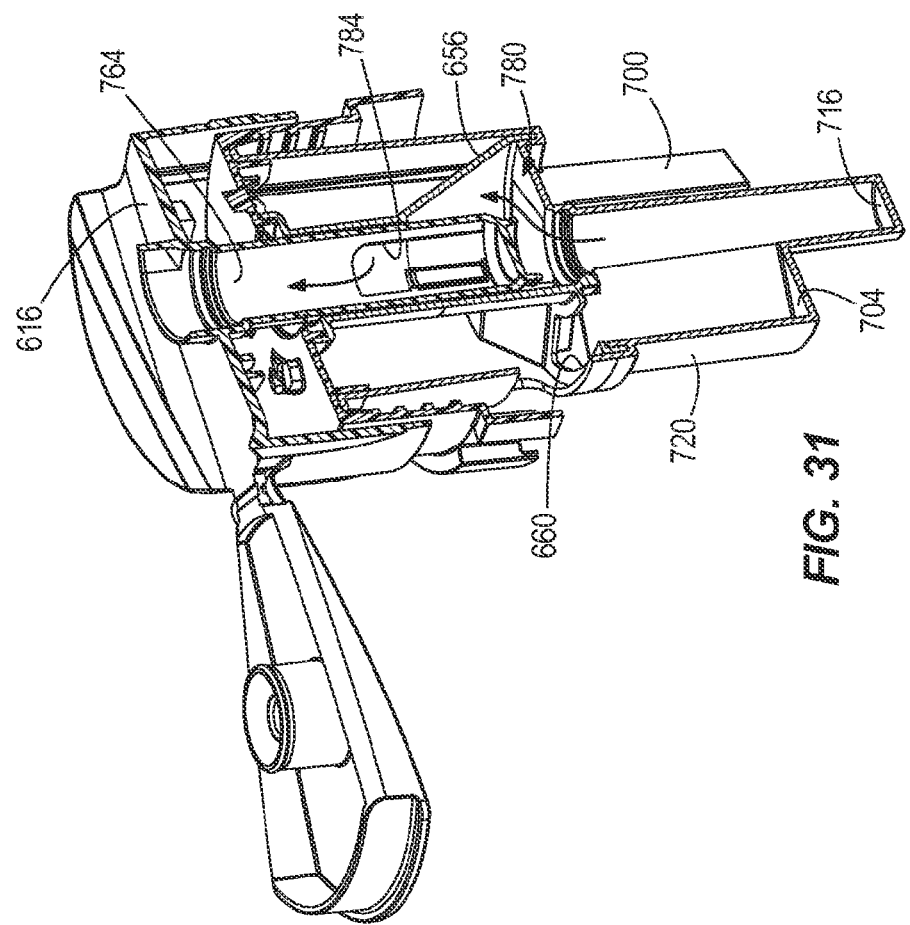
FIG. 32 is a side view of FIG. 31 illustrating the cap in cross-section.
Figure 33:
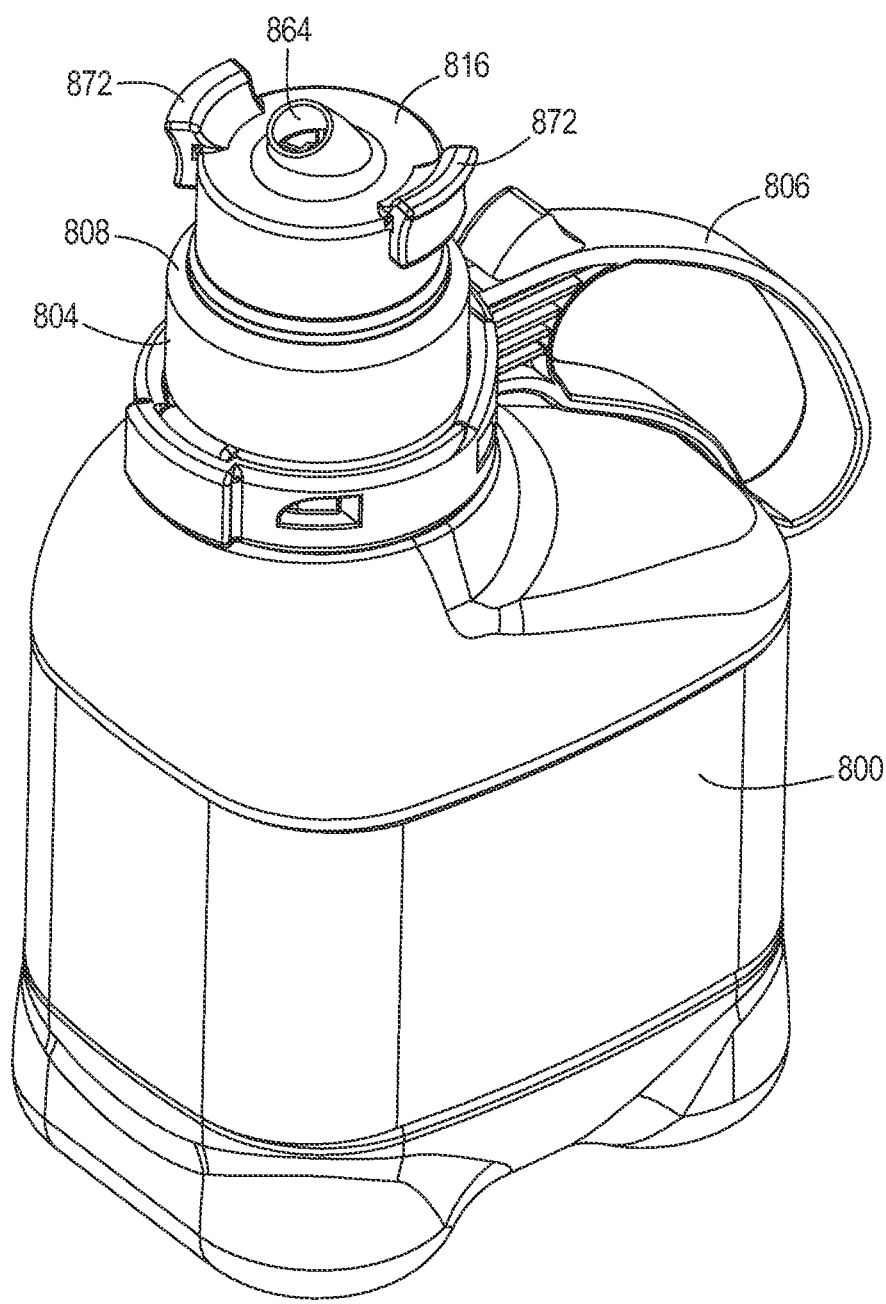
FIG. 33 is a perspective view of another container and a cap embodying the invention.

As illustrated in FIGS. 27 and 30, the cap base 608 is removably coupled to the container 600 by a threaded connection. Referring to FIGS. 21, 24, and 26, the illustrated cap base 608 includes a substantially cylindrical body that defines a circumferential sidewall 620 and an upper surface 624 that has annular projections 628 extending along the longitudinal axis A. The sidewall 620 has an annular flange 632 that supports and defines a stop for the actuator 616, and slotted ridges 636 that extend upward from the flange. As shown, the cap base 608 has several (e.g., four) slotted ridges 636 spaced circumferentially around the exterior of the cap base 608. Extensions or tabs 640 (hereinafter referred to as "tabs 640" for purposes of description) extend upward along the axis A at the juncture of the sidewall 620 and the upper surface 624 (i.e. at the circumferential edge of the upper surface 624) to support the actuator 616. A hole 644 is disposed in the upper surface 624 cap base 608 on the axis A.

Referring to FIGS. 21, 22, 25, and 27-31, the insert 610 coupled to and positioned between the cap base 608 and the housing 612. The insert 610 has an elongated conduit or chimney or column 648 (referred to as the "column 648" for purposes of description) extending along and aligned with the axis A. The column 648 has an annular rim 652 at the top that connects to and is engaged with the cap base 608. The insert 610 also has a skirt 656 downwardly depending from the column 648 (e.g., at a point about midway down the column 648) and a chamber inlet 660 between end walls 664 of the skirt 656. The rim can be integrally formed with the cap base 608 if the cap base 608 and the skirt 656 are formed as one piece (e.g., by co-molding, etc.). The rim cooperates with radially spaced lips 668 of the cap base 608 to seal the interior of the cap base 608. As illustrated, the skirt 656 extends partially around the column 648—approximately 270 degrees—and is partially defined by a stepped portion 672.

FIGS. 25-28 and 30-32 show that the insert 610 and the housing 612 cooperatively define a main or holding chamber 676 that is in fluid communication with the interior of the container 600 via a window or housing inlet 680 (hereinafter referred to as the "housing inlet 680" for purposes of description). Generally, the holding chamber 676 is defined by a first volume between the walls of the housing 612 and the insert 610. The housing 612 has an annular channel 684 into which an annular rim 652 of the skirt 656 is disposed to separate the holding chamber 676 from the remainder of the housing 612. The insert 610 and the housing 612 can be one piece or separate pieces coupled together.

FIGS. 19-21 and 24-28 illustrate that the housing 612 has a first or upper housing portion 688 and a second or lower housing portion 692 that is integrally formed (e.g., molded with) with the first housing portion 688, although the housing portions 688, 692 can be separate elements coupled together (e.g., via welding, keyed features, snap features, etc.). As illustrated, the insert 610 is held in place by tapered wedges 696 extending longitudinally along the inner wall of the first housing portion 688. The housing inlet 680 is formed in a wall of the first housing portion 688 so that, in use, fluid from the container 600 can flow into the holding chamber 676. As shown in FIG. 24, the inlet 680 extends partially around the outer wall of the first housing portion 688 and is defined by a substantially rectangular shape when viewed from the side, although the inlet 680 can be defined by other shapes.

With reference to FIGS. 20, 24-28, and 30-32, the second housing portion 692 has a half-cylinder shape that in cross-section is substantially semi-circular (see FIG. 24). The second housing portion 692 includes a first measuring chamber 700 and a second measuring chamber 704 that are separated from each other by a reservoir wall 708 and that are partially capped by a platform 712 of the housing 612. Each measuring chamber is curves partially around the axis A, although other shapes for the chambers are possible and considered herein. Also, each of the first and second measuring chambers 700, 704 is in fluid communication with the holding chamber 676 via the chamber inlet 660 of the insert 610.

Figure 25:
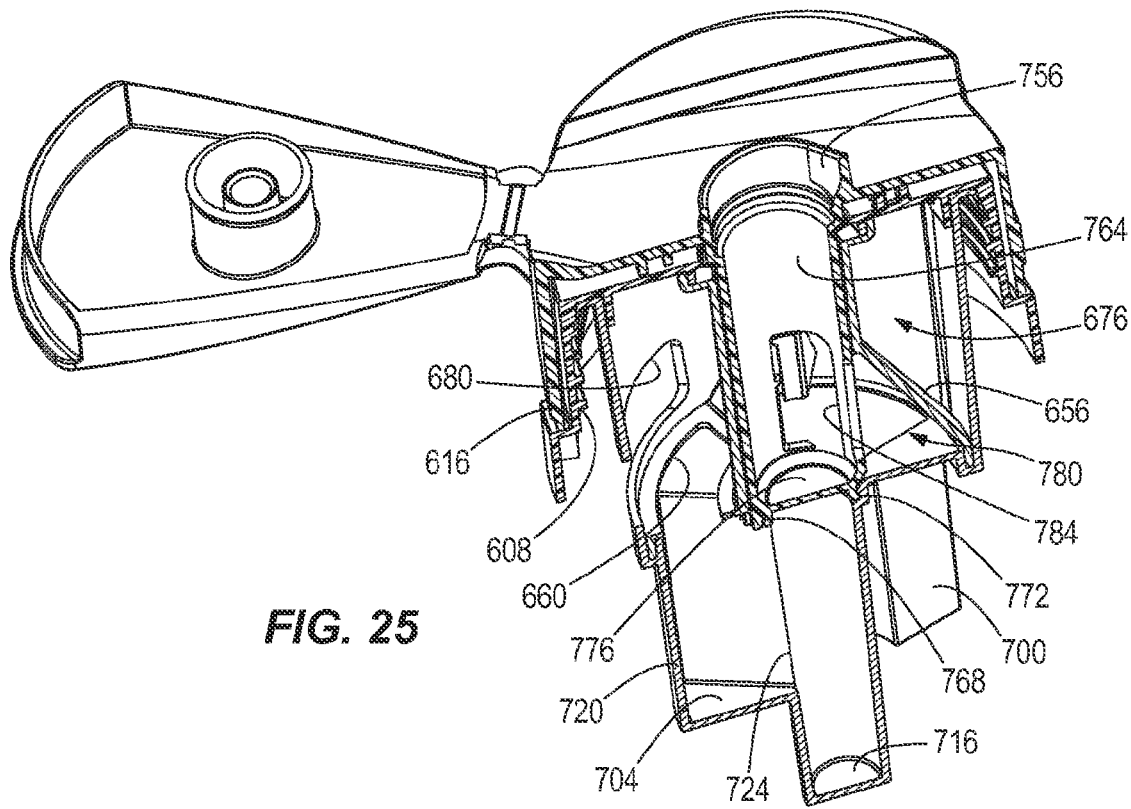
FIG. 25 is a cross-sectional perspective view of the cap of FIG. 19 taken along line 25-25.

The first measuring chamber 700 has a second volume that is smaller than the first volume and that is predetermined to correspond to a first desired fluid dosage amount. The second measuring chamber 704 has a third volume that is smaller than the first volume. The third volume can be larger or smaller or the same as the second volume. As explained in detail below, the second and third volumes are predetermined to correspond to a second desired fluid dosage amount. With reference to FIGS. 24 and 25, the second measuring chamber 704 is defined by a central chamber section 716 arranged on the axis A, and an annular chamber section 720 that is in fluid communication with the central chamber section 716 via an axially-oriented opening 724.

FIGS. 17-21 and 23 illustrate that the actuator 616 has a cylindrical body or shroud 728 that substantially covers the cap base 608 when the cap 604 is assembled. The actuator 616 is slidably attached to the cap base 608 by elongated protrusions 732 that slidably mesh or engage with the slotted ridges 636. The actuator 616 also has annular, spaced apart projections 736 that are complementary to the projections on the cap base 608. When coupled together, the attachment between the cap base 608 and the actuator 616 resists complete removal of the actuator 616 from the cap base 608 so that the actuator 616 can move a small amount (e.g., 5-15 millimeters) relative to the cap base 608.

The actuator 616 has an aperture 740 extending through a side of the body so that, when the actuator 616 is coupled to the cap base 608, a portion of the sidewall 620 is exposed through the aperture 740. As illustrated, the actuator 616 also has a cover 744 that is hinged to an edge of the actuator 616 (e.g., via a thin bridge element 748—see FIG. 18) to selectively enclose the top of the actuator 616 when the cap 604 is not in use.

Figure 17:
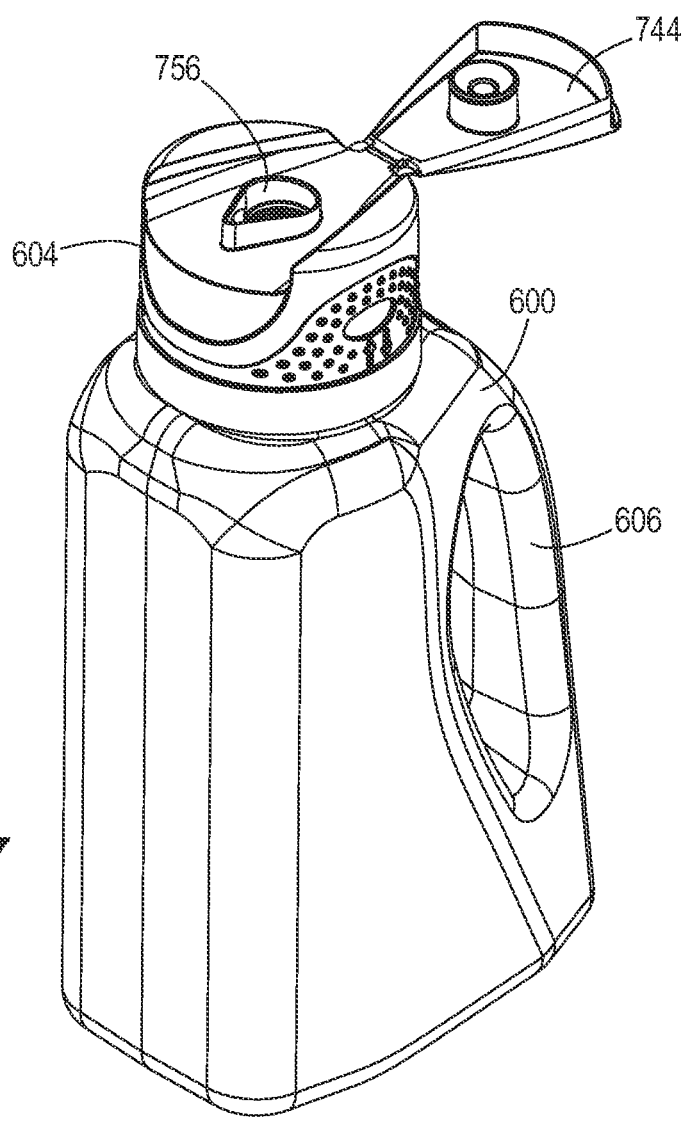
FIG. 17 is a perspective of another dispensing cap embodying the invention and coupled to a container.

FIGS. 17, 19, and 21 illustrates that the exterior top side of the actuator 616 includes a depression 752 that accommodates the cover 744, and a spout or outlet 756 that is centrally disposed in the depression 752 to facilitate pouring material or fluid from the cap 604. As illustrated, the outlet 756 is rounded and tapers toward a front side of the container (i.e. toward the left in FIG. 17, the side opposite the side of the container with the handle 606). Referring to FIGS. 21 and 23, 25, and 27, the outlet 756 is fluidly connected to an axially-aligned passageway 760 that is defined by a cylindrical post or outlet column 764 ("outlet column 764" for purposes of description) extending from the shroud 728. The inner end of the outlet column 764 has an annular protrusion 768 that is releasably engaged with (snap-fit with) an annular recess 772 of the housing 612 adjacent the upper end of the second measuring chamber 704. The outlet column 764 also has a wall 776 adjacent the lower end to prevent fluid communication from the second measuring chamber 704 directly into the passageway 760.

With continued reference to FIGS. 20, 24-28, and 30-32, the area under the skirt 656 and between the skirt 656 and the platform 712 defines a transfer chamber 780 that receives fluid or material from one or both of the first measuring chamber 700 and the second measuring chamber 704, and that delivers the fluid or material to the passageway 760 for dispensation using the spout. As illustrated in FIGS. 27, 28, and 30-32, the passageway 760 is in fluid communication with the transfer chamber 780 via openings 784 in the outlet column 764. The illustrated openings 784 are elongated along the axis A and spaced annularly around the outlet column 764, although other shapes and arrangements are possible and considered herein.

Referring to FIGS. 17, 18, 27, and 29-32, the actuator 616 is movable relative to the cap base 608 between a first position (FIGS. 17, 18, 27) corresponding to a first dosage amount and a second position (FIGS. 29-32) corresponding to a second dosage amount. The actuator 616 has an actuating surface 788 that can be gripped or manipulated by a user to move the actuator 616 between the first position and the second position. The illustrated actuating surface 788 has a plurality of bumps or protrusions 792 that increase the friction between the user and the actuating surface 788 to make it easier to move the actuator 616. Also, indicia 796 indicative of the dosage amount (e.g., bottle, bucket, etc.) can be imprinted or otherwise provided on the sidewall 620 so that the indicia 796 can be visible based on the position of the actuator 616.

Figure 18:
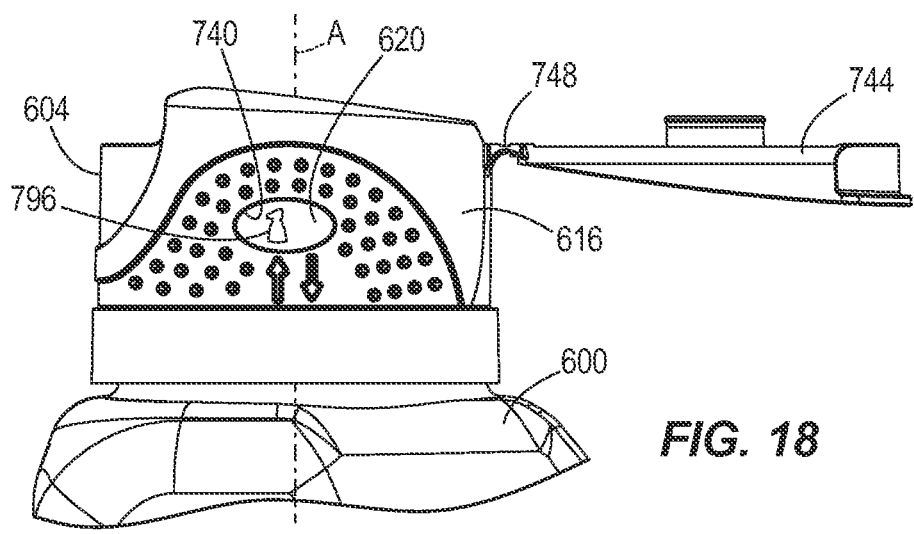
FIG. 18 is a side view of the cap and the container of FIG. 17.

Referring to FIGS. 17, 18, and 27, when the actuator 616 is in the first position, the end of the outlet column 764 is engaged with the inner annular wall of the housing 612 so that only the first measuring chamber 700 is in fluid communication with the outlet 756 via the openings 784. As illustrated, fluid or material can flow from the first measuring chamber 700 through the open upper end of the first measuring chamber 700 into the transfer chamber 780, and then through the openings 784 into the passageway 760 before reaching the outlet 756. The seal defined by the annular protrusion 768 and the annular recess 772 prevents communication between the second measuring chamber 704 and the interior of the tube passageway 760 when the actuator 616 is in the first position.

As shown in FIGS. 29-32, when the actuator 616 is moved to the second position (illustrated as vertically above the first position), the outlet column 764 is disengaged from the annular recess 772 of the housing 612 such that fluid or material in the second measuring chamber 704 can flow through the gap now formed between the housing 612 and the outlet column 764. In the second position, fluid or material flows from both the first and second measuring chambers 700, 704 when the container 600 with the dosing cap 604 are inverted to dispense the fluid or material from the container 600.

As will be appreciated from the description and the drawings, operation of the container 600 and the dispensing cap 604 is the same as operation of the container 100 and the dispensing cap 104 described with regard to FIGS. 1-10. As such, operation of the container 600 and the dispensing cap 604 will only be briefly described.

The dispensing cap 604 is primed by first moving the container 600 to a substantially inverted (i.e. upside-down) orientation, such that a fluid (liquid or powder) can flow under a gravitational force from the container 600 into the holding chamber 676 via the housing inlet 680. The fluid fills the holding chamber 676 up to the level of the housing inlet 680 that is highest (when the assembly is inverted) or in some cases, another predetermined level. Next, the container 600 is moved into a substantially vertical (i.e. right-side-up) orientation such that fluid flows under a gravitational force from the holding chamber 676 to both the first measuring chamber 700 and the second measuring chamber 704 through the chamber inlet 660. The fluid fills the first measuring chamber 700 and the second measuring chamber 704. Because the container 600 and the cap 604 are now mostly upright or completely upright, no fluid is dosed through the outlet column 764.

A user selects the desired dose to be administered by placing the actuator 616 in either the first position or the second position. That is, if the actuator 616 is in the first position, a first dose of fluid will be dispensed from the outlet 756 according to the second volume of the first measuring chamber 700. If, on the other hand, the actuator 616 is in the second position, a second, larger dose of fluid will be dispensed from the outlet 756 according to the combined volume of the first measuring chamber 700 and the second measuring chamber 704. After the desired dose amount is selected, the container 600 is inverted so that fluid flows from at least the first measuring chamber 700, through the transfer chamber 780, into the outlet column 764, and eventually through the outlet 756. Fluid flows from both chambers 700, 704 through the transfer chamber 780 when the actuator 616 is in the second position.

The holding chamber 676 is refilled with fluid when the container 600 is inverted, thereby priming the cap 604 for a subsequent dose as the current dose is evacuated from one or both of the measuring chambers 700, 704. Both measuring chambers 700, 704 can be filled at the same time with the actuator 616 in the first position or the second position. The cap 604 continuously primes the holding chamber 676 for a subsequent dose each time a dose is dispensed regardless of the amount of fluid dispensed. This permits the cap 604 to repeatedly dispense identical doses without requiring the user to actuate the actuator 616 between doses. Furthermore, after the initial inversion to prime the measuring chambers 700, 704, either dose size is available to the user at any time. If the user desires to switch dose sizes, the cap 604 does not require the user to re-prime the measuring chambers 700, 704. That is, both measuring chambers 700, 704 are primed each time the cap 604 is inverted and either the first dose size or the second dose size is available to the user for the subsequent dose after each dose is administered. This simplifies dose selection and minimizes error because it is not necessary to dispose of a dose of the fluid and re-prime the cap 604 if the wrong dose size is initially selected.

FIGS. 33-38 illustrate another bottle or container 800 and a dosing cap 804 embodying the invention. A handle 806 facilitates manipulation of the container 800. The cap 804 defines a longitudinal axis B and includes an intermediate cap or cap base 808, a housing 812, and a lid or cap actuator 816 (hereinafter referred to as the "actuator 816" for purposes of description only) movably coupled to the cap base 808.

Figure 34:
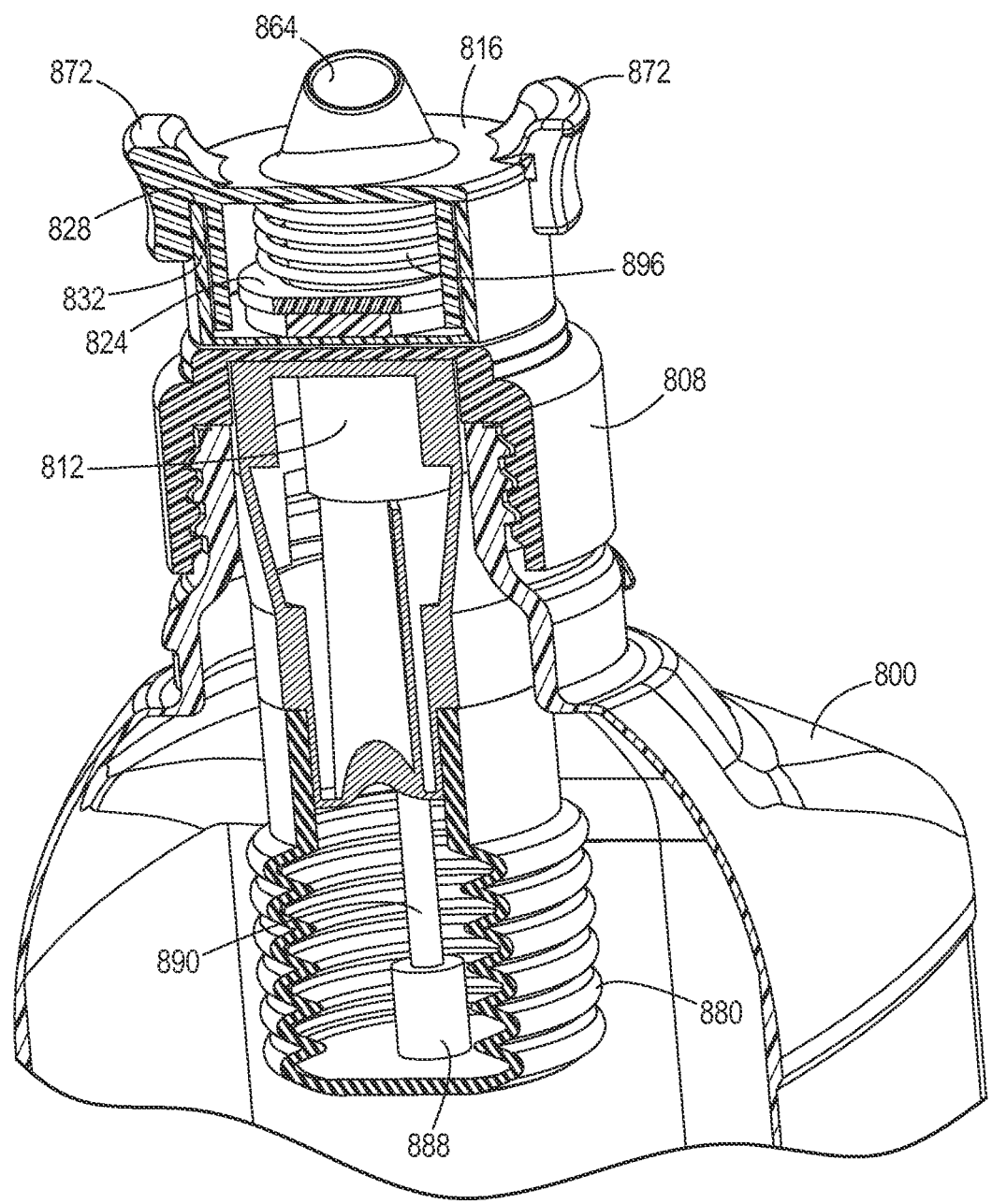
FIG. 34 is a cross-sectional perspective view of the container and the cap of FIG. 33 taken along line 34-34 and illustrating a cap base, an actuator, and a cap housing or reservoir.
Figure 38:
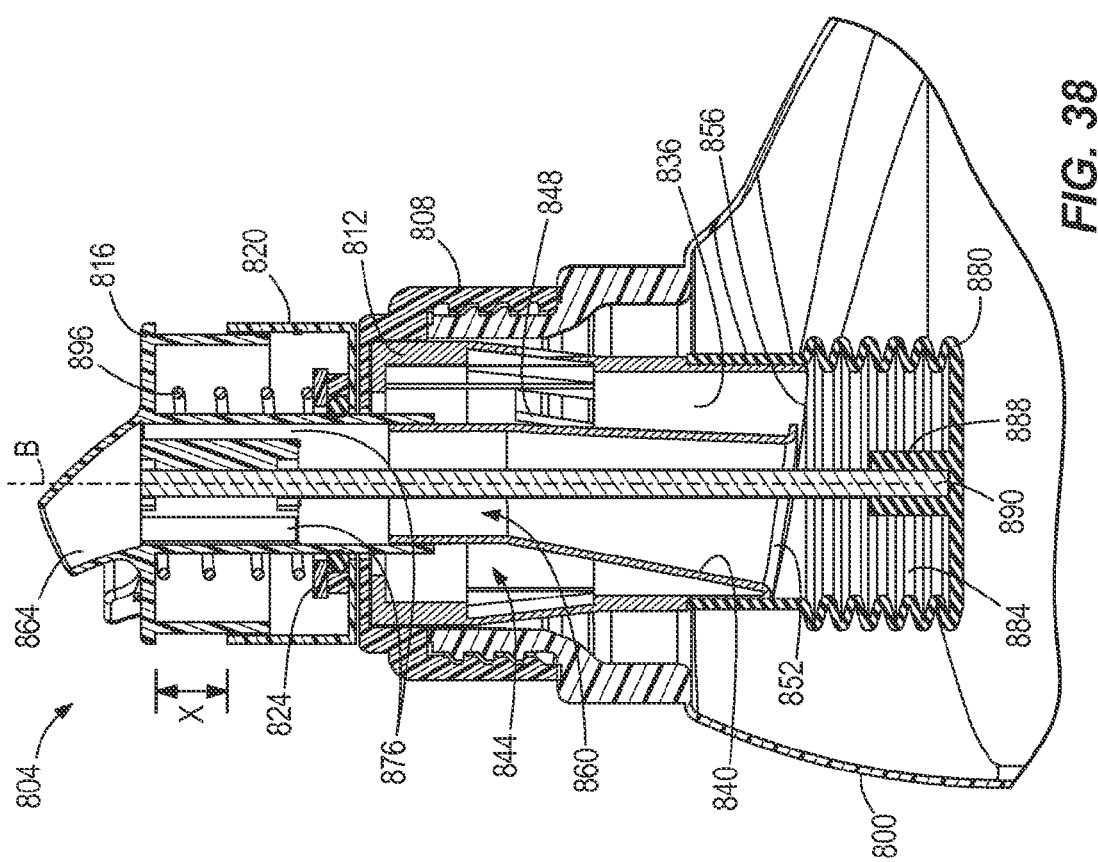
FIG. 38 is a section view of the container and the cap of FIG. 36 taken along line 38-38.
Figure 37:
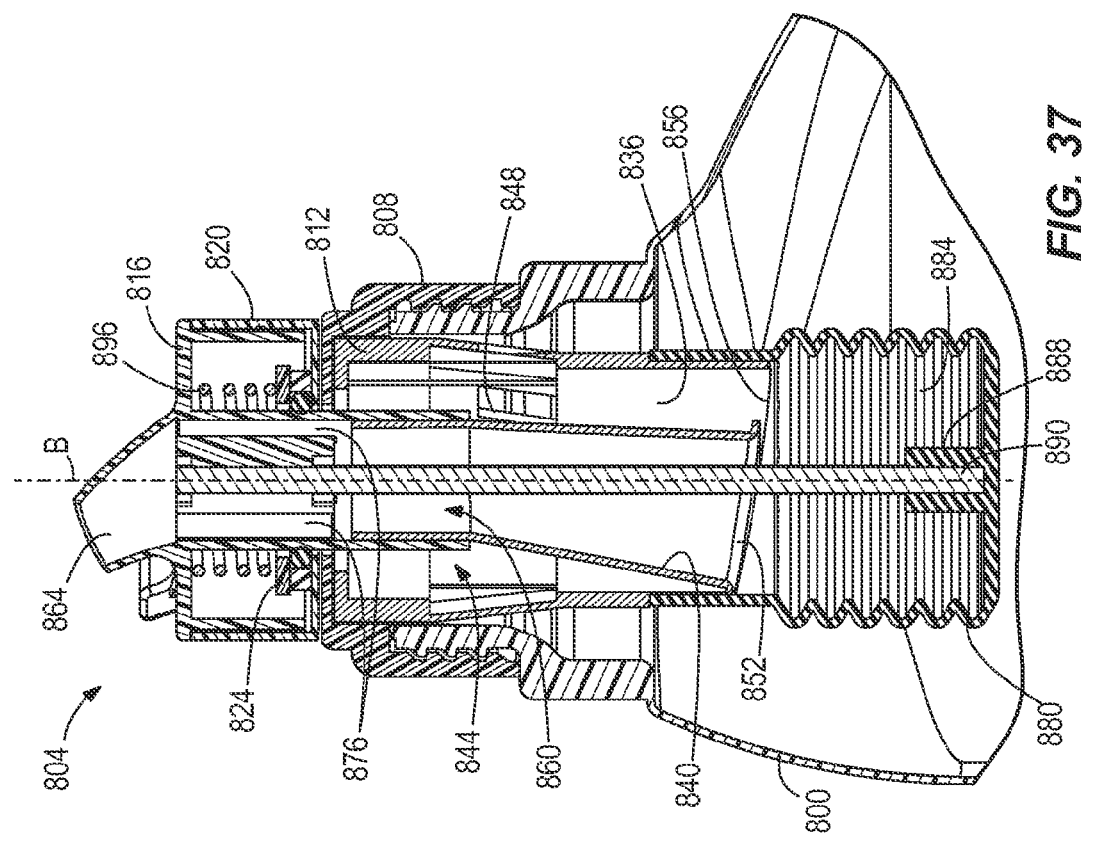
FIG. 37 is a section view of the container and the cap of FIG. 35 taken along line 37-37.

As illustrated, the cap base 808 is removably coupled to the container 800 by a threaded connection. Referring to FIGS. 34, 37, and 38, the illustrated cap base 808 includes a substantially cylindrical body that defines a circumferential sidewall 820 above the threaded portion and an annular, raised flange 824 located within the interior of the sidewall 820. The sidewall 820 has an annular rim 828 that supports and defines a stop for the actuator 816, and an annular rib 832 facilitates attachment of the actuator 816 to the cap base 808.

The housing 812 has an annular outer wall 836 and an annular inner wall 840. The annular outer wall 836 is coupled to the cap base 808 (e.g., integrally formed) and defines an exterior of the housing 812. The annular outer wall 836 cooperates with the annular inner wall 840 to define a charge or holding chamber 844 that is in fluid communication with the container 800 via one or more housing inlets 848 defined in the outer wall 836. Generally, the holding chamber 844 is defined by a first volume between the walls of the housing 812. The inner wall 840 extends upward from a platform 852 that connects the outer wall 836 to the inner wall 840. The platform 852 has a chamber inlet 856 disposed on one side of the housing 812, and the inner wall 840 also defines an outlet passageway 860.

With continued reference to FIGS. 37 and 38, the actuator 816 has a cylindrical body that is engaged with an interior surface of the sidewall 820 and that has a spout or outlet 864. The rim of the cap base 808 nests in an annular recess 868 defined in the actuator 816 between actuator arms 872 disposed on an outer periphery of the actuator 816. The actuator 816 is slidably attached to the cap base 808 by a suitable connection (similar or different from the connections described above). The outlet 864 is defined by a plurality of openings 876 (only two shown) that are in fluid communication with the outlet passageway 860 to dispense fluid when desired.

The cap 804 also includes a flexible bellows 880 that is coupled to a lower end of the housing 812 to define an adjustable measuring chamber 884 of the cap 804. The flexible bellows 880 is secured (e.g., adhered or welded) to the outer wall 836 and includes a closed end with a rod attachment 888 extending axially inward from the closed end. A bellows rod or member 890 is coupled to the bellows 880 via the rod attachment 888. The rod or member 890 extends from the bellows 880 along the axis B (illustrated as on the axis B) to the actuator 816 so that, upon movement of the actuator 816, the volume of the measuring chamber 884 can be adjusted. As illustrated, the measuring chamber 884 is always in fluid communication with the housing inlet 848 and the outlet 864 via the outlet passageway 860, and has a second volume that can be smaller or larger or the same as the first volume associated with the holding chamber 844. The second volume is predetermined to correspond to a desired fluid dosage amount.

Figure 35:
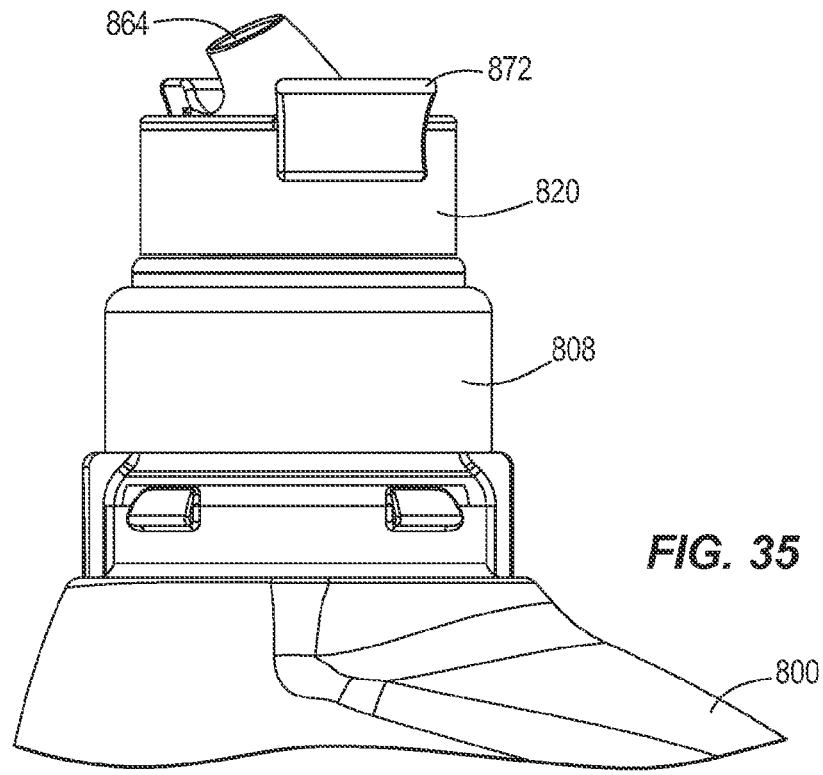
FIG. 35 is a side view of the container and the cap of FIG. 33 illustrating the actuator in a first position.
Figure 36:
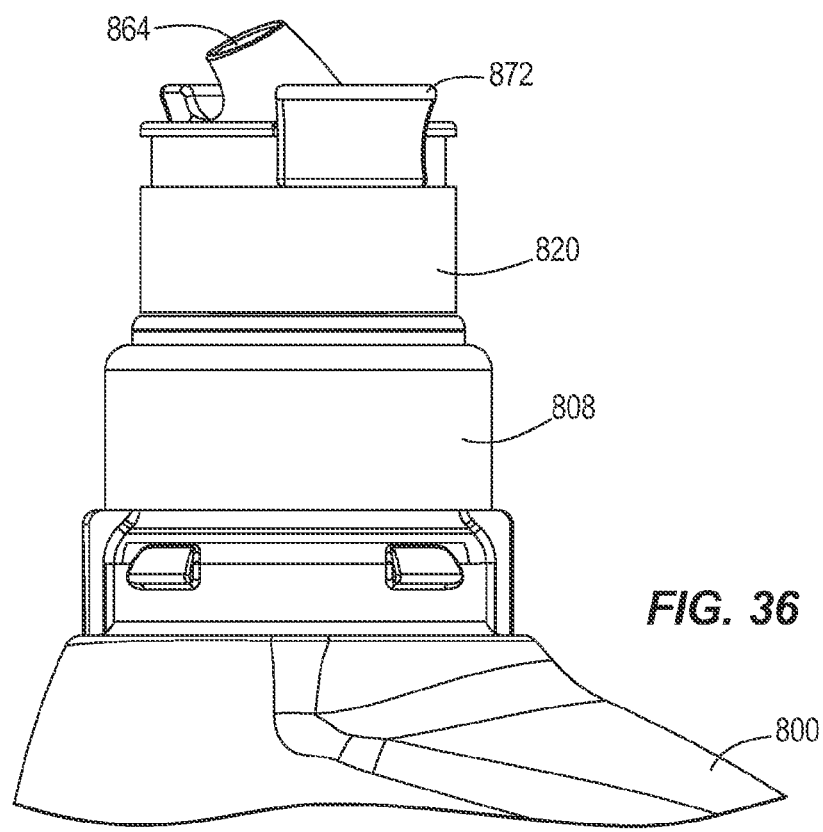
FIG. 36 is a side view of the container and the cap of FIG. 33 illustrating the actuator in a second position.

Referring to FIGS. 33-38, the actuator 816 is movable relative to the cap base 808 between a first position (FIGS. 35 and 37) and a second position (FIGS. 36 and 38). The actuator 816 is coupled to an upper end of the inner wall 840 so that no fluid can enter the outlet passageway 860 directly from the holding chamber 844. The actuator 816 has an actuating surface 894 on the actuator arms 872 that can be gripped or manipulated by a user to move the actuator 816 between the first position and the second position. Although not shown, the actuating surface 894 can have surface features (e.g., bumps, protrusions, etc.) that increase the friction between the user and the actuating surface 894.

A spring 896 is coupled to and positioned between the cap base 808 and the actuator 816 to bias the actuator 816 to the first position so that when fluid is dispensed, the measuring chamber 884 returns to the largest possible second volume. In operation, the actuator 816 remains in the first position until a user moves the actuator 816 to the second position.

The cap 804 is primed by first moving the container 800 to a substantially inverted (i.e. upside-down) orientation such that a fluid (liquid or powder) can flow under a gravitational force from the container 800 into the holding chamber 844 via the housing inlet 848. The fluid fills the holding chamber 844 up to the level of the housing inlet 848 that is highest (when the assembly is inverted) or in some cases, another predetermined level. Next, the container 800 is moved into a substantially vertical (i.e. right-side-up) orientation such that fluid flows under a gravitational force from the holding chamber 844 to the measuring chamber 884 through the chamber inlet 856. The fluid fills the measuring chamber 884, and because the container 800 and the cap 804 are now upright, no fluid is dosed through the outlet passageway 860.

A user selects the desired dose to be administered by placing the actuator 816 in either the first position or the second position, or another position between the two positions. Referring to FIGS. 35 and 37, when the actuator 816 is in the first position, the largest possible second volume of fluid or material can flow from the measuring chamber 884 through the outlet passageway 860 to the outlet 864 when the container 800 is again inverted. As shown in FIGS. 36 and 38, when the actuator 816 is moved to the second position (illustrated as vertically above the first position), the actuator 816 pulls on the rod 890, which in turn acts on the bellows 880 to compress the bellows 880 upward. This action reduces the volume of the measuring chamber 884 and forces the excess fluid out of the housing inlet 848.

Generally, excess fluid can flow through the outlet 864 when the second volume is smaller than the first volume, or when the volume of the measuring chamber 884 is adjusted after the chamber has been charged. When the container 800 is again inverted to dispense fluid, the volume of fluid defined by the measuring chamber 884 is dispensed through the outlet 864 via the outlet passageway 860. Stated another way, if the actuator 816 is in the first position, a first dose of fluid will be dispensed from the outlet 864 according to the largest second volume of the measuring chamber 884. If, on the other hand, the actuator 816 is in the second position, a second, smaller dose of fluid will be dispensed from the outlet 864. While the illustrated cap 804 has two discrete actuator 816 positions, infinite flexibility can be provided between the two positions by adjusting the amount of travel between the cap base 808 and the actuator 816.

Similar to the description for FIGS. 1-32, the holding chamber 844 is refilled with fluid when the container 800 is inverted, thereby priming the cap 804 for a subsequent dose as the current dose is evacuated from the measuring chamber 884. This permits the cap 804 to repeatedly dispense identical doses or user-selected doses without requiring the user to actuate the actuator 816 between doses. If the user desires to switch dose sizes, the cap 804 does not require the user to re-prime the measuring chamber 884. This simplifies dose selection and minimizes error because it is not necessary to dispose of a dose of the fluid and re-prime the cap 804 if the wrong dose size is initially selected.

Figure 39:
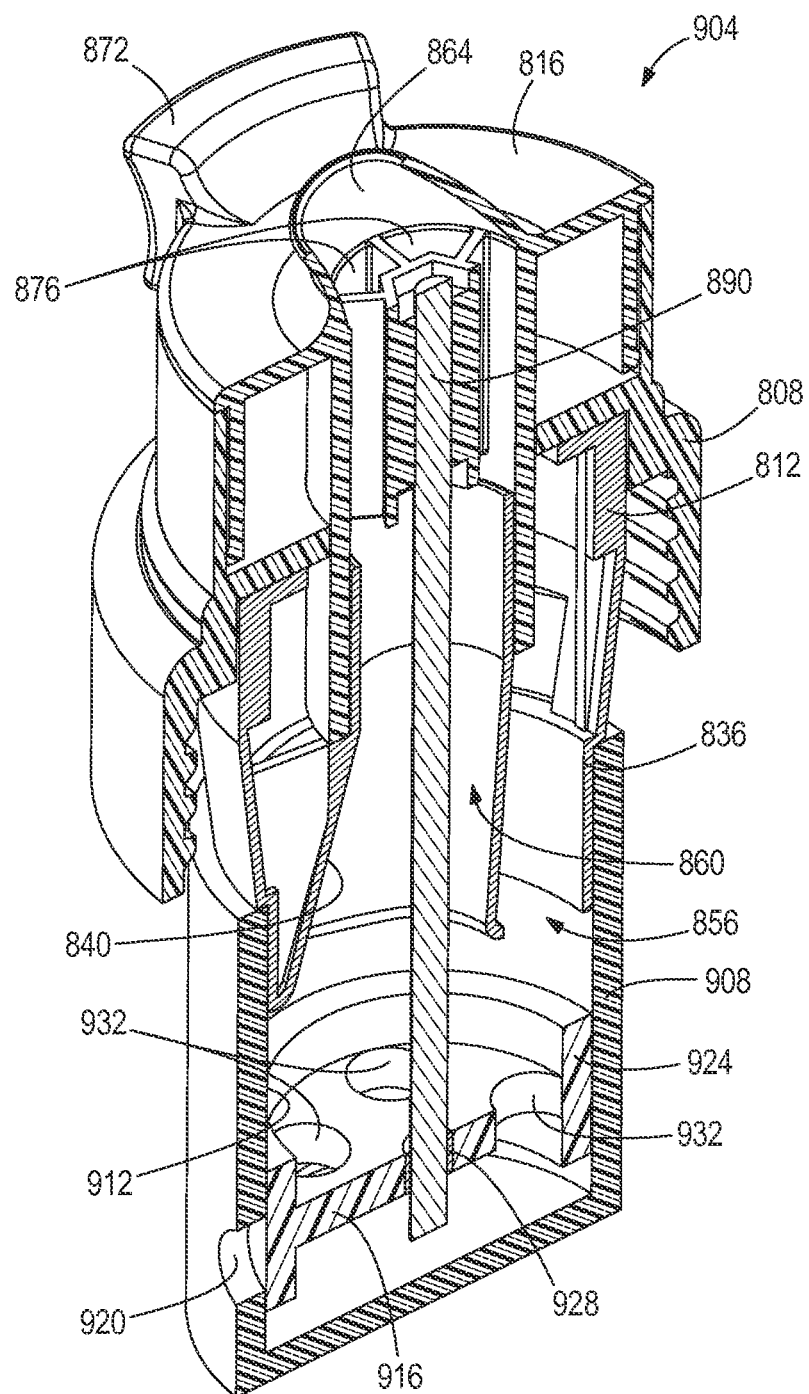
FIG. 39 is a cross-sectional perspective view of another cap embodying the invention.

FIGS. 39-41 illustrate another dosing cap 904 embodying the invention. Except as described below, the dosing cap 904 is the same as the dosing cap 804 described with regard to FIGS. 33-38, and like elements are given the same reference numerals.

Referring to FIGS. 39-41, the cap 904 includes a cup 908 that defines a measuring chamber 912 and a baffle plate 916 that is movable relative to the cup 908 to adjust the volume of fluid contained in the measuring chamber 912. As illustrated, the cup 908 is attached to the housing 812 at the lower end of the cap 904 in place of the bellows 880 described relative to FIGS. 33-38. The cup 908 has a plurality of openings 920 that are selectively in fluid communication with the container 800 so that fluid from the measuring chamber 912 can flow back to the container 800 when a desired dose size is smaller than the largest volume of the measuring chamber 912.

The baffle plate 916 is coupled to the rod or member 890 and moves with the rod or member 890 to selectively expose the openings 920 in the cup 908 based on the desired dose size. The illustrated baffle plate 916 has a circumferential wall 924 that is engaged with the interior of the cup 908, and a central aperture 928 to which the rod or member 890 is connected. The baffle plate 916 also has spaced apart holes 932 (e.g., concentric with the axis B) that provide fluid communication through the baffle plate 916 so that fluid above the baffle plate 916 can flow down through the baffle plate 916 when a volume adjustment is desired.

As illustrated, the measuring chamber 912 is always in fluid communication with the housing inlet 848 and the outlet 864 via the outlet passageway 860, and has a second volume that can be smaller or larger or the same as the first volume associated with the holding chamber 844. The second volume is predetermined to correspond to a desired fluid dosage amount.

The actuator 816 is movable relative to the cap base 808 between a first position (FIGS. 39 and 40) and a second position (FIG. 41). Although not shown, a spring can coupled to and positioned between the cap base 808 and the actuator 816 to bias the actuator 816 to the first position, the second position, or an intermediate position. In operation, the actuator 816 remains in the selected position until a user moves the actuator 816.

The cap 904 is primed by first moving the container 800 to a substantially inverted (i.e. upside-down) orientation such that a fluid (liquid or powder) can flow under a gravitational force from the container 800 into the holding chamber 844 via the housing inlet 848. The fluid fills the holding chamber 844 up to the level of the housing inlet 848 that is highest (when the assembly is inverted) or in some cases, another predetermined level. Next, the container 800 is moved into a substantially vertical (i.e. right-side-up) orientation such that fluid flows under a gravitational force from the holding chamber 844 to the measuring chamber 912 through the chamber inlet 856. The fluid fills the measuring chamber 912, and because the container 800 and the cap 904 are now upright, no fluid is dosed through the outlet passageway 860.

A user selects the desired dose to be administered by placing the actuator 816 in either the first position or the second position, or another position between the first position and the second position. Referring to FIGS. 39 and 40, when the actuator 816 is in the first position, the largest possible second volume of fluid or material can flow from the measuring chamber 912 through the outlet passageway 860 to the outlet 864 when the container 800 is again inverted. More specifically, fluid can flow through the baffle plate 916 via the holes 932 when the container 800 is upright and when the container 800 is inverted. Because the baffle plate 916 obstructs or blocks the openings 920 in the cup 908, no fluid can flow back to the container 800 through the openings 920.

As shown in FIG. 41, when the actuator 816 is moved to the second position (illustrated as vertically above the first position), the actuator 816 pulls on the rod 890, which in turn acts on and moves the baffle plate 916 upward. At a predetermined distance (e.g., corresponding to the second position of the actuator 816), this action reduces the volume of the measuring chamber 912 by permitting fluid flow from the measuring chamber 912 into the container 800 through the wall of the cup 908. When the desired dosage amount is reached (e.g., based on expiration of a predetermined time or a distance that the actuator 816 is moved in relation to time), the actuator 816 is returned to the first position to close off the openings 920, stopping the flow of fluid from the cup 908 to the container 800. Thereafter, when the container 800 is again inverted to dispense fluid, the volume of fluid defined by the measuring chamber 912, and possibly reduced by operation of the actuator 816, is dispensed through the outlet 864 via the outlet passageway 860. While the illustrated cap 904 has been described with two discrete actuator 816 positions, infinite flexibility can be provided between the two positions by adjusting the amount of travel between the cap base 808 and the actuator 816 and adjusting the size and location of the openings 920 in the cup 908, as well as by adjusting movement of the baffle plate 916.

With regard to the embodiments described relative to FIGS. 17-41, because the container is inverted and tipped to dispense fluid in a predetermined orientation defined in part by the location and orientation of the outlet, the fluid to be dispensed flows toward the outlet instead of the holding chamber so that an accurate dose amount can be dispensed.

Various features and advantages of the invention are set forth in the following claims.

The invention claimed is:

1. A dispensing cap comprising:
a first housing portion defining a first chamber;
a lid coupled to the first housing portion and defining an outlet, the lid movable relative to the first housing portion between a first position and a second position;
a second housing portion defining a second chamber in fluid communication with the first chamber, the second housing portion further defining a third chamber separate from the second chamber,
wherein when the lid is in the first position, the outlet is in fluid communication with the second chamber to dispense a first volume of fluid, and
wherein when the lid in the second position, the outlet is in fluid connection with the second chamber and the third chamber to dispense a second volume of fluid.

2. The dispensing cap of claim 1, wherein the first chamber has a first outlet fluidly connecting the first chamber and the second chamber, and a second outlet fluidly connecting the first chamber and the third chamber.

3. The dispensing cap of claim 1, further comprising an outlet column extending from the outlet toward the second and third chambers, wherein the outlet column is in fluid communication with the second chamber in the first position, and the outlet column is in fluid communication with the second and third chambers in the second position.

4. The dispensing cap of claim 3, wherein in the first position, a portion of the outlet column is coupled to the third chamber, and in the second position, the outlet column is withdrawn from the third chamber.

5. The dispensing cap of claim 4, wherein an end of the outlet column has a seal engageable with a wall defining the third chamber.

6. The dispensing cap of claim 1, wherein the lid has a longitudinal axis, and wherein the lid is axially movable between the first and second positions along the longitudinal axis.

7. The dispensing cap of claim 1, further comprising an inlet coupled to the first chamber, the inlet positioned to fluidly connect the first chamber to a reservoir.

8. The dispensing cap of claim 7, further comprising a flap coupled to the inlet, wherein the flap is selectively openable in response to the dosing cap being re-oriented from a first orientation to a second orientation to fluidly connect the first chamber to the reservoir, and wherein the flap is adapted to close to interrupt fluid communication between the first chamber and the reservoir.

9. The dispensing cap of claim 1, wherein the first housing portion supports the lid.

10. The dispensing cap of claim 1, wherein the second chamber and the third chamber are concentric relative to each other.

11. The dispensing cap of claim 1, wherein the first housing portion is movable relative to the second housing portion.

12. The dispensing cap of claim 11, wherein the dispensing cap has a longitudinal axis, and wherein the first housing portion is movable between the first and second positions along the longitudinal axis.

13. A method of operating a dispensing cap comprising:
selectively actuating the dosing cap between a first position and a second position, the first position fluidly connecting a nozzle and a first measuring chamber, and the second position fluidly connecting the nozzle and both the first measuring chamber and a second measuring chamber;
dispensing a chemical retained in one or both of the first and second measuring chambers; and
refilling the dispensing cap while dispensing by permitting fluid communication between a fluid reservoir and a holding chamber defined by the dispensing cap, the holding chamber in fluid communication with the first and second measuring chambers.

14. The method of claim 13, wherein during the dispensing and refilling steps, the dispensing cap is inverted.

15. The method of claim 14, further comprising
refilling the first and second measuring chambers by positioning the dispensing cap in a non-inverted position, and
permitting fluid flow from the holding chamber to the first and second measuring chambers.

16. A dispensing cap comprising:
an upper housing portion defining an inlet, a manifold in fluid communication with the inlet, a first outlet in fluid communication with the manifold, and a second outlet in fluid communication with the manifold;
a lower housing portion including a first chamber in fluid communication with the first outlet and a second chamber in fluid communication with the second outlet; and
a lid movable between a first position and a second position, the lid being in fluid communication with the first chamber when the lid is in the first position, the lid being in fluid communication with the first chamber and the second chamber when the lid is in a second position.

17. The dispensing cap of claim 16, wherein the lid includes an elongated tube extending at least partially through the upper housing portion and the lower housing portion, the elongated tube being selectively placed in fluid communication with the first chamber and the combination of the first chamber and the second chamber as the lid is moved between the first position and the second position.

18. The dispensing cap of claim 17, wherein the upper housing portion and the lower housing portion define a longitudinal axis, the second chamber being centered on the longitudinal axis and the first chamber extending around at least a portion of the second chamber, wherein the elongated tube is centered on the longitudinal axis.

19. The dispensing cap of claim 16, wherein when the cap is oriented in a first state, fluid flows through the inlet and into the manifold, wherein when the cap is oriented in a second state, fluid flows through the first outlet to the first chamber and through the second outlet to the second chamber, and wherein when the cap is re-oriented in the first state, fluid from at least the first chamber flows through the lid.

20. The dispensing cap of claim 19, wherein in the first state the cap is oriented in an upside-down vertical orientation, wherein in the second state the cap is oriented in a right-side-up vertical orientation.

21. A dispensing cap comprising:
a first housing portion defining at least one chamber;
a second housing portion coupled to the first housing portion;
an actuator movable with respect to the second housing portion to and between first and second positions corresponding to first and second doses of fluid dispensed from the at least one chamber through the dispensing cap, wherein the first dose is different in size from the second dose;
an indicator on one of the second housing portion and the actuator indicative of an amount or a relative amount of fluid that will be dispensed from the cap when the cap is inverted; and
an aperture defined in another of the second housing portion and the actuator,
wherein the indicator is visible through the aperture in the first position of the actuator, and is not visible through the aperture in the second position of the actuator.

22. A dispensing cap comprising:
a housing defining a first chamber and a second chamber, the first chamber in fluid communication with the second chamber;
an actuator coupled to the housing and carrying an outlet, the actuator movable about the housing between a first position and a second position; and
a member extending from the actuator to a wall of the second chamber, the wall being movable with the actuator between the first and second positions to selectively adjust the volume of the second chamber.

23. The dispensing cap of claim 22, wherein the second chamber includes flexible bellows.

24. The dispensing cap of claim 22, wherein the wall is a baffle plate provided in the second chamber.

25. The dispensing cap of claim 24, wherein the baffle plate includes at least one hole.

* * * * *